US006302658B1

(12) United States Patent
Seipel et al.

(10) Patent No.: US 6,302,658 B1
(45) Date of Patent: Oct. 16, 2001

(54) SWASH PLATE-COMPRESSOR

(75) Inventors: Volker Seipel, Bensheim; Jan Hinrichs, Friedrichsdorf, both of (DE)

(73) Assignee: Luk Fahrzeug-Haydraulik GmbH & Co. KG, Bad Homburg (DE)

( * ) Notice: Subject to any disclaimer, the term of this patent is extended or adjusted under 35 U.S.C. 154(b) by 0 days.

(21) Appl. No.: 09/486,576

(22) PCT Filed: Aug. 31, 1998

(86) PCT No.: PCT/DE98/02561

§ 371 Date: Apr. 6, 2000

§ 102(e) Date: Apr. 6, 2000

(87) PCT Pub. No.: WO99/11930

PCT Pub. Date: Mar. 11, 1999

(30) Foreign Application Priority Data

| Aug. 29, 1997 | (DE) | 197 37 887 |
| Sep. 23, 1997 | (DE) | 197 41 979 |
| Dec. 10, 1997 | (DE) | 197 54 697 |
| Dec. 11, 1997 | (DE) | 197 55 188 |
| Mar. 17, 1998 | (DE) | 198 12 885 |

(51) Int. Cl.$^7$ .................................... F04B 1/12
(52) U.S. Cl. .................. 417/269; 417/222.1; 91/499; 74/60; 74/399
(58) Field of Search .................. 417/222.1; 91/499; 74/399, 60

(56) References Cited

U.S. PATENT DOCUMENTS

| 3,861,829 | 1/1975 | Roberts et al. |  |
| 4,553,905 | 11/1985 | Swain et al. |  |
| 4,674,957 | 6/1987 | Ohta et al. |  |
| 5,647,266 | * 7/1997 | Claas | 92/71 |
| 5,975,860 | * 11/1999 | Obayashi et al. | 417/223 |

FOREIGN PATENT DOCUMENTS

| 2415206 | 10/1974 | (DE). |
| 3500298A1 | 11/1985 | (DE). |
| 35 45 200A1 | 7/1986 | (DE). |

* cited by examiner

Primary Examiner—Charles G. Freay
Assistant Examiner—E D Hayes
(74) Attorney, Agent, or Firm—Alston & Bird LLP

(57) ABSTRACT

A compressor, in particular for the air conditioning system of an automobile, with a housing (1) and a compressor unit (2) accommodated in the housing (1) for taking in and compressing a refrigerant, wherein the compressor unit (2) comprises pistons (7) reciprocating in a cylinder block (6) and a drive disk—swash plate or pivot disk (8)—that drives the pistons (7), is characterized for increasing efficiency in that the drive disk (8) is supported such that a center line (9) of the bearing mount (pivoting or bearing axis) forms a tangent to a reference circle (10) defining the stroke, so that an angle of inclination (11) of the drive disk (8) is variable, without displacing the dead center above the stroke position. Furthermore, for increasing efficiency, the compressor is characterized in that the drive disk is supported such that the center line of the bearing mount (pivoting or bearing axis) forms a tangent to the reference circle defining the stroke, so that the angle of inclination of the drive disk is variable, without displacing the dead center above the stroke position. Furthermore, for increasing efficiency, the compressor is designed and constructed such that components coming into contact with the refrigerant, preferably the walls forming a flow path between an intake area and a discharge area are thermally insulated against the refrigerant at least in part and in areas of contact. Finally for an effective protection of the belt in the case of a blocking drive shaft or compressor unit, the compressor is designed and constructed such that a coupling device automatically disengages, when a defined thermal and/or mechanical load limited is exceeded.

18 Claims, 14 Drawing Sheets

SWASH PLATE-COMPRESSOR

BACKGROUND OF THE INVENTION

The present invention relates to a compressor of the type used in automotive air conditioning systems.

Furthermore, in the case of the known compressors of the kind under discussion, it is essential that the angle of inclination of the swash plate or pivot disk, hereafter drive disk, can be varied by means of a special coupling mechanism, namely for reciprocating the pistons. However, with respect to the longitudinal axis of the piston, the drive disks tilts due to its geometric arrangement or due to the pivot axis there in such a manner that the dead center "travels" above the stroke position. This results in a tilting error or a damage area, which has a negative effect on the efficiency of the compressor.

Also known from practice are beginnings of reducing the damage area, namely in terms of constructing extremely expensive solutions with internal coupling mechanisms. To this end, reference may be made, for example, to DE 35 45 200 C2 and corresponding U.S. Pat. No. 4,674,957. Despite the constructional expenditure incurred therein, it has so far not been possible to eliminate the problems discussed therein, so that a resultant loss in efficiency is accepted in the case of the so-far known compressors of the kind under discussion.

Furthermore, the invention relates to a compressor, in particular for the air conditioning system of an automobile, with a housing and a compressor unit accommodated in the housing for taking in and compressing a refrigerant, the refrigerant flowing from an intake area preferably formed in the a front-end housing cover through the compressor unit into a discharge area preferably likewise formed in the housing cover.

Air-conditioning compressors of a large variety of types operate with a refrigerant. Besides conventional refrigerants, whose use appears to become more and more critical in the light of an increasing awareness of the environment, it is possible to use as a refrigerant an inert gas, such as, for example, $CO_2$, which is noncritical under environmental aspects. However, the use of such a refrigerant leads to higher pressures within the compressor, thereby necessitating quite special constructional measures, for example, with respect to the selection of material and wall thickness of the housing.

The use of a high-strength material for the housing of the compressor makes it easy to absorb as early as in the intake state the high pressures necessary or occurring in the case of a refrigerant having a high density. For example, it is thus necessary to withstand bursting pressures of up to 30 MPa at discharge temperatures of up to about 160° C. to 170° C.

As aforesaid, compressors of the kind under discussion comprise an intake area and a discharge area. Whereas on the suction side—in the intake area—the refrigerant flows in at a temperature mostly ranging from 30° C. to 40°, the temperatures on the pressure side, i.e., discharge area, are in a range from 80° C. to about 170° C.

Normally, compressor housings are made of metal, for example, aluminum, of high-quality steel, or of a high-tensile steel. Consequently, the high temperature in the discharge area is bound to become effective on the intake area to the extent that same is heated via the housing material coming into contact with the refrigerant, as well as the "interiors" of the compressor. As a result, the gaseous refrigerant is heated on the intake side, whereby its density decreases. This again leads to a loss in delivery or a reduction of the mass flow of the refrigerant and, thus, to a loss in output of the compressor. Because of the temperature influence by the discharge area on the intake area, the efficiency of a conventional compressor is considerably reduced.

Likewise, the invention relates to a compressor, in particular for the air conditioning system of an automobile, wherein a belt drives the compressor unit via a drive wheel coupled with the drive shaft, and wherein the drive wheel comprises a belt pulley body engaging the belt, the belt pulley body being coupled via a coupling device directly or indirectly with the drive shaft.

The compressors under discussion are driven via a belt, which is guided over a belt pulley hereafter drive wheel. The belt in turn is driven via the crank shaft of the internal combustion engine of an automobile.

Malfunctions may occur in the operation of the compressor. Thus, for example, the compressor unit or the drive shaft may block. If the belt loops about the drive wheel at a very small angle, the belt is expected to slip on the drive wheel or the belt pulley. In this instance, the drive wheel will heat up very considerably. This leads already after a short time to damage and finally to destruction of the belt, so that even the subassemblies that are also driven by the belt, such as, for example, the water pump or alternator, can no longer be operated. As a result, the automobile is no longer operable.

If the belt loops about the drive wheel or belt pulley at a larger angle, for example, more than 180°, it is hardly possible that the belt slips on the drive wheel or belt pulley. This leads either to a tearing of the belt or to a choking of the engine. Likewise, in such an instance, the automobile is no longer operable.

To avoid the above-described problems, an electromagnetic clutch has already been integrated in the drive wheel of the compressor. Should the belt slip or should the clutch halves slip, the clutch will undergo a very considerable heating. If a predetermined temperature is reached, a safety fuse will interrupt the coil current, and the clutch disengages the compressor, so that the belt can continue to move with the belt pulley body of the drive wheel. This ensures the operation of safety-relevant components of the automobile, such as, for example, the water pump and/or the alternator, which are likewise driven by this belt.

However, the electromagnetic clutch as known from practice, is problematic, inasmuch as it is constructed relatively large, expensive with respect to its individual components, and represents a quite considerable cost factor. Primarily, due to its complexity, such an electromagnetic clutch causes an extraordinary weight load, which is diametrically opposite to a weight reduction as is constantly sought in the current automobile construction. Because of its enormous overall size, the compressor is not suitable for installation in small engine compartments.

From practice alone, it is already known to provide an overload clutch with a disk-shaped rubber body having an external gear tooth system, whose gear teeth shear in the event of excessive stress. In this case, the clutch is a purely mechanical overload clutch, whose disengagement behavior can be defined only in a certain bandwidth. At any rate, such an overload clutch is barely reliable.

It is the object of the present invention to improve and further develop a compressor of the initially described kind such that its efficiency becomes more favorable in comparison with conventional compressors, that the compressor is constructed smaller, that its weight is reduced, and that accordingly it is easier and less expensive to manufacture the compressor. Furthermore, it is an object to increase output and to ensure at a lesser expense at least the same safety, in particular a protection of the belt drive and the internal combustion engine, as in the case of compressors known until now.

SUMMARY OF THE INVENTION

The above and other objects and advantages of the present invention are achieved by the provision of a compressor of the described type and wherein the drive disk is supported such that the center line of the bearing mount (pivot or bearing axis) forms a tangent to a reference circle that defines the stroke, so that the angle of inclination of the drive disk is variable without displacing the upper dead center above the stroke position.

To begin with, it has been recognized by the invention that is possible to increase the efficiency of a compressor of the described kind by optimizing the damage area. It has further been recognized that an optimization of the damage area is possible by realizing a special bearing mount of the drive disks, i.e., the swash plate or pivot disk. According to the invention, the drive disk is mounted such that the center line of the bearing mount, i.e. the pivot or bearing axis of the drive disk forms a tangent to the reference circle that defines the stroke, so that the angle of inclination of the drive disk is variable, without displacing the upper dead center above the stroke. In other words, the pivot or bearing axis of the drive disk is positioned such the drive disk tilts exactly above the longitudinal axis of the piston. This precludes the dead center from changing in the stroke position of the piston, or from shifting. Instead, it is held constant above the stroke position.

Finally, the measure of the present invention accomplishes that the instantaneous pole lies on the diameter of the reference circle. Accordingly, the instantaneous pole is stationary, when related to the rotating reference system in the case of the drive shaft. In this instance, it is easily possible to realize pivotal movements of the drive disk up to about 20°.

Concretely, the drive disk is operatively connected to the drive shaft via a coupling mechanism associated to its edge region. To this end, it is possible to joint the drive disk, via the coupling mechanism, to an entraining member that is nonrotatably connected to the drive shaft, so as to able to perform there the pivotal movement. In a further advantageous manner, the entraining member surrounds the drive disk at least in part. In this instance, the entraining member may be made annular, preferably cylindrical. Likewise, it is possible to design and construct the entraining member as a ring segment. At any rate, the entraining member may be both a separate component and an integral component of the drive shaft.

In a further advantageous manner, the entraining body forms a stop for the pivotal movement of the drive disk. In this connection, the stop may be both for a maximal and for a minimal pivotal movement of the drive disk. Accordingly, during the movement, the drive disk or a there-provided shoulder or the like comes into contact within the entraining member. To this end corresponding contact surfaces, steps, cants, or the like are provided.

The drive disk is supported via a pivot bearing operative between the drive disk and the entraining member. This pivot bearing may be designed in many different ways. For example, the pivot bearing may comprise spherical segments or bearing pins that are operative between the drive disk and the entraining member.

According to the foregoing description, the coupling mechanism is associated to the edge region of the drive disk. In this arrangement, it is of further advantage that the here concretely selected pivot bearing engages the entraining member according to its width in such a positioned manner that the drive disk tilts exactly above the longitudinal axis of the piston.

As likewise described before, the drive disk serves to move the pistons. To this end, coupling means are operative between the drive disk and the pistons, which comprise an embracing element associated to the piston and preferably operative in the fashion of a slideway, and a spherical body associated to the drive disk and preferably operative in the fashion of a slide shoe. In other words, the coupling means are a jointed arrangement, which permits a movement of the pistons along their longitudinal axis free of deviations, wherein the drive—via the drive disk—is operative at constantly changing angles.

As regards a concrete development of the coupling means, it is very important that the embracing element of the piston extend through the drive disk on the side facing the drive shaft, and enclose it outwardly at least in part, preferably with the inclusion of the slide shoe or spherical body. Consequently, in this instance, an encircling engagement occurs from the inside, whereas in the previously known compressors of the kind under discussion, an encircling engagement is realized exclusively from the outside. With a corresponding dimensioning of the cylinder block and the pistons, it will be possible to reduce the overall size, at any rate, however, the diameter of a semicircle.

Furthermore, it will be of advantage, when the cylinder block comprises an antirotation device for the pistons. The antirotation device may be realized in many different ways. Thus, it would be possible to provide a support surface between the cylinder block and piston, so that insofar the piston is prevented from rotating. Likewise, it would be possible to realize the antirotation device as a support surface between the piston and drive shaft. Likewise possible is a support surface between the piston and entraining member. As an alternative, it would be possible to make the pistons "noncircular," so that an antirotational protection is realized with a corresponding configuration of the cylinder block. Finally, it would be possible to associate to the piston a guide element as an antirotation device, which may be a pin or the like.

It is also possible to modify the drive disk itself, namely in that it operates in the fashion of a centrifugal governor as is sufficiently known from practice.

As regards a further, concrete realization of the teaching according to the invention, it will be of advantage, when the drive disk is operatively connected to the drive shaft via a guide arm that is rigidly joined to the drive shaft and supported for sliding movement in the drive disk, preferably in its edge region. In addition to absorbing axial forces, the guide arm could also transmit the torque of the drive shaft. At any rate, the guide arm is rigidly connected to the drive shaft, with the sliding mount of the guide arm in the edge region of the drive disk enabling a tilting of the drive disk.

In particular with respect to a stable construction of the guide arm, same could be designed and constructed as a square bar, and in a further advantageous manner, it could be mounted in the drive shaft orthogonally to its longitudinal axis. In this connection, it is possible that the guide arm is pressed into a corresponding recess of the drive shaft. The rigid arrangement of the guide arm on or in the drive shaft is ensured by frictional engagement.

For a sliding support of the guide arm in the drive disk, the free end of the guide arm mounts a guide member, with which the guide arm engages the drive disk. The guide member could be made substantially cylindrical crosswise to the guide arm, with the guide member being directly or indirectly supported in the drive disk.

Thus, it would be possible to use the guide member with its surface for a sliding contact with opposite inside walls of the drive disk. To this end, the substantially cylindrical configuration of the guide member will be especially suited. The necessary engagement of the guide arm in the drive disk makes it possible that the inside wall of the drive disk defines the tilting angle of the drive disk, namely in that it forms a stop for the guide arm, which is rigidly connected to the drive shaft.

As regards the operative connection between the pivoting or wobbling drive disk and the piston, different constructions are possible. Thus, it would be possible to provide in the effective range of the guide member, on both sides of the drive disk, spherical segments for pivotally engaging the piston. The spherical segments operate between the outside wall of the drive disk that consists of one or more parts, and corresponding slide surfaces in the piston. In this arrangement, the center of the ball formed by the two spherical segments lies in the center of the cylindrical guide member or on its longitudinal axis, so that a displacement of the upper dead center above the stroke position is effectively avoided.

To realize the slide surface that is to be provided at the free end of the piston, the piston could extend with its connecting region about the free end of the drive disk to engage the spherical elements. This embracing engagement could be made approximately C-shaped. In this connection, corresponding surfaces of spherical segments are formed on both sides of the drive disk—for guiding or receiving the spherical segments. At any rate, it will be easy to guide the piston via the guide arm and the here-proposed joint connection.

As an alternative to the foregoing development, the drive disk could be operatively connected, via a friction bearing, to the piston that mounts at its end a slide shoe. To this end, the piston could be constructed as a cylindrical solid body with a movable slide shoe, with the latter connecting to the piston by means of a spherical joint. The pivotal movement of the drive disk is thus compensated via the spherical joint.

For an operative connection between the drive disk and the piston, one could provide between the drive disk and the piston a special depressor, which pushes the slide shoe onto the drive shaft. At any rate, this depressor is nonrotatably mounted. Between the depressor, the slide shoe, and the drive disk, a friction bearing is operative. In a very advantageous manner, and while realizing a simple type of construction, this friction bearing could comprise a spacer ring extending between the drive disk and the depressor, and a depressor guideway following the spacer ring and extending at least in part over the depressor. In this construction, the surface of the drive disk facing the spacer ring ultimately forms a part of the friction bearing. By all means, it must be ensured that the drive disk is able to rotate, and that a sliding movement of the drive disk relative to the piston is possible.

The depressor pushing the slide shoe onto the drive disk could be constructed preferably as a circular disk. In this connection, an adaptation to the drive disk will be of advantage. Corresponding to the number of the pistons, passageways are provided for the piston or for a connection between the spherical joint and the slide shoe, so that the piston or this connection can extend through the depressor. The passageways may be constructed as slots terminating at the edge of the depressor or as elongate holes. In the case that the passageways are made as—laterally closed— elongate holes, one will obtain a higher rigidity of the depressor and, thus, a greater degree of operational reliability.

For axially guiding the drive disk and, in particular, likewise for transmitting the torque, a guide pin rigidly connected to the drive disk engages an elongate hole provided in the drive shaft, or a corresponding passageway, there being an adequate play between the guide pin and the elongate hole. The guide pin could unilaterally extend into the elongate hole and end therein. In a very advantageous manner, however, the guide pin extends through the elongate hole and connects to the drive disk on both sides of the drive shaft. This ensures a reliable, axial guidance between the drive shaft and the drive disk, in particular, however, also for transmitting the torque.

For an axial guidance of the drive disk, it would likewise be possible that a guide member rigidly connected to the drive disk engages a guideway formed on the drive shaft. However, this guideway is formed outside of the drive shaft. Likewise, it would be possible that for an axial guidance, the drive disk engages the drive shaft by means of a guide sleeve. At any rate, it is essential that the axial guidance of the drive disk occurs by an operative connection to the drive shaft and possibly not by an external joint connection of the drive disk.

As a further aspect of the invention, the components coming into contact with the refrigerant, preferably the walls forming the flow path between the intake area and the discharge area are thermally insulated against the refrigerant at least slightly and in areas of contact.

It has further been recognized by the present invention that the high temperature difference between the discharge area and intake area of a conventional compressor of the kind under discussion leads to a decrease of efficiency, due to a heating of the intake area and, thus, likewise of the there-entering refrigerant because of the thermal conductivity of the compressor components.

Furthermore, it has been recognized by the present invention that the here-analyzed problems can be lessened, in that components coming into contact with the refrigerant are thermally insulated to a certain degree, so that the heating of the refrigerant is at least reduced. To this end, the walls forming the flow path between the intake area and the discharge area are thermally insulated against the refrigerant at least slightly—in areas of contact. The definition "thermal insulation" does here not mean a complete insulation for avoiding a heat transfer. Instead, it means a reduction of the thermal conductivity from components of the compressor to the refrigerant by means of passive measures. In this connection, a thermal insulation provided in areas of contact will already decrease heating of the taken-in refrigerant and, thus, increase the efficiency of the compressor.

Concretely, the heat insulation could be realized as a lining of a material having a low thermal conductivity. Accordingly, the lining is applied to the walls forming the flow path within the compressor. In this connection, even a partial lining in the intake area will already turn out to be quite successful.

With respect to a particularly simple construction of the compressor, it would be possible to realize the thermal insulation as a coating of a material with a low thermal conductivity. In this instance, conventional coating techniques are considered, which require that the material, for example ETFE (ethylene tetrafluoroethylene=Teflon serves, among other things, as a protection against wear and tear), be resistant to temperatures in a range up to 170° C.

Within the scope of a particularly simple construction of the compressor, the thermal insulation is provided on the inside wall of the intake channel. This permits reducing the heating of the taken-in refrigerant already on the intake side. To further reduce a heating of the taken-in refrigerant, the thermal insulation is provided in a quite particularly advantageous manner on the inside wall of the entire intake area, thereby decreasing again a heating of the refrigerant sucked in in the intake area.

If one departs from the fact that both the intake area and the discharge area are formed in a housing cover, often also named pressure cover, it would be possible to provide the thermal insulation likewise on the inside wall of the discharge channel, or even on the inside wall of the entire discharge area. This means, one could provide the entire inside wall of the housing cover with a corresponding thermal insulation. To this extent, it would be possible to treat the thermal insulation uniformly on the entire inside wall of the housing cover, or apply it thereto uniformly in the case of a coating.

As previously mentioned, it would be possible to realize the thermal insulation in the form of a lining. To this extent, it is especially advantageous to realize the lining within the housing cover in the form of a loose insert, so that this insert defines the flow path for the refrigerant.

For a further reaching reduction of the thermal conductivity between the housing cover, it would be possible to space the lining at least slightly from the inside wall of the housing cover, so that a space remains between the actual inside wall of the housing cover and the lining. This interspace decreases again the heat transfer between the housing cover and the refrigerant.

Concretely, the lining could lie against the inside wall of the housing cover with partially shaped, preferably integral spacers, so that the spacing between the insert and the inside wall of the housing cover is not decreased because of the inflowing refrigerant.

Within the scope of a further alternative, it would be possible to realize the lining or coating in the form of a porous foam, whereby a gaseous cushion—within the foam—leads to a reduction of the heat transfer between the inside wall of the housing cover and the refrigerant. It is desired that the foam have an open porosity, so that its structure is not destroyed in the event of occurring pressure differences.

As previously mentioned, it would also be possible to coat the inside wall of the housing cover as a whole, namely all over, where the flow path of the refrigerant is defined by the inside wall of the housing cover. Within the scope of such a coating, it is also possible to impart to same a surface structure that promotes the flow, such as, for example, to provide there a defined roughness, which may have the surface structure of a shark skin. At any rate, such a measure is able to promote the flow within the intake and discharge areas.

Likewise, it is possible to provide the inside wall of the housing cover only with a rough finish, and to realize the required surface structure by the coating. Thus, for example, it would also be possible to smooth by means of a suitable coating material the surface of the inside wall of the housing cover, which is too rough for the flow of the refrigerant.

In the case of the compressors under discussion, the housing cover comprising the intake and discharge areas abuts a valve plate, so that the flow path of the refrigerant is defined at least in part between the valve plate and the inside wall of the housing cover. To this extent, it will be of further advantage, when the thermal insulation is also provided on the valve plate. To this end, it would be possible to coat the valve plate on its side facing the housing cover, as may also be done with the inside wall of housing cover.

As an alternative, it is also possible—as in the case of the inside wall of the housing cover—to apply a loose insert to the valve plate on its side facing the housing cover. Moreover, this insert can also be effective in the way of a seal at least in the edge region and in transitional regions between the valve plate and the housing cover.

The foregoing description relates to a reduction of the thermal conductivity between the inside wall of the housing cover and refrigerant. However, it is possible to further reduce a heating of the refrigerant in that surfaces in the pump unit, which additionally form the flow path, or adjoin the flow path, are coated with a material of a low conductivity. To such a coating, it would be possible to attach directly two functions, namely, on the one hand the attempted reduction of a heat transfer between the component of the compressor and the refrigerant, and on the other hand the application of a protective coating against wear and tear for lengthening the service life of the compressor.

If the pump unit is designed and constructed as an axial piston pump, it will be possible to coat the working surface of the cylinder in the cylinder block with the material of a low conductivity. A thermal insulation applied thereto, which simultaneously serves as a protective coating against wear and tear, will be exceptionally advantageous due to the mechanical stress normally occurring in this region.

Furthermore, it is possible to coat the surface of the piston likewise with the low-conductivity material, where the coating serves at the same time as a protection against wear and tear.

Regardless of the foregoing measures for reducing a heat transfer between components of the compressor and the refrigerant by means of a lining or coating, a further measure for reducing the heat transfer could lie in that the housing cover itself is made of a material having a low thermal conductivity. In this connection, the housing cover could consist of a metal having a low thermal conductivity, for example, a high tensile steel, which exhibits a yet considerably lower thermal conductivity than aluminum. In a very advantageous manner, the housing cover is made of a ceramic material or ceramic composite, which reduces the heat transfer quite considerably, even without a coating or lining of the flow path.

Further parts of the object are accomplished by further characteristics of the invention in that in a compressor, whose compressor unit is driven by a belt via a drive shaft and a drive wheel coupled therewith, wherein the drive wheel comprises a belt pulley body engaging the belt, which is directly or indirectly coupled with the drive shaft via a coupling device, the coupling device automatically disengages, when a defined, thermal and/or mechanical load limit is exceeded.

To this extent, it has been recognized by the present invention that the disengagement has to occur automatically, namely upon exceeding a defined thermal load limit, a defined mechanical load limit, or upon exceeding selectively one of the two foregoing load limits. Ultimately, the intent here is to ensure that an automatic disengagement occurs by all means. In this connection, it is possible to predetermine the kind of the load limit to be exceeded as well as the amount of the load capacity.

With that, it is intended to avoid by all means that a blocking of the compressor unit or the drive shaft leads to a blocking or to damage of the belt. Lastly, it is intended to accomplish that even when the compressor unit or the drive shaft blocks, the belt is able to continue to run more or less unimpeded, with only the compressor being inoperative due to the occurred defect.

Concretely, the coupling device that engages in the normal operation of the compressor, could comprise a coupling element that is operative between the belt pulley body and a coupling disk engaging the drive shaft. This coupling element is responsible for the actual engagement and, thus, for the drive of the compressor unit. In particular, also with respect to a small overall size, it will of advantage, when the coupling element is arranged between the inside surface of the belt pulley body and the outside surface of the coupling disk. In such a case, the two surfaces—inside surface of the belt pulley body and outside surface of the coupling disk—are arranged in coaxial relationship with each other. In other words, the belt pulley body serving to receive the belt extends substantially annularly around the coupling disk. In this arrangement, both the belt pulley body and the coupling disk have two adjacent and parallel extending surfaces. Arranged therebetween is the coupling device with the coupling element.

Furthermore, it would be possible to provide between the coupling element and the coupling disk or a drive flange of the compressor unit, a vibration damper associated to the coupling device for damping rotary vibrations. This damper may be an elastomeric element or a rubber-metal element. With respect thereto, the coupling device may comprise the coupling element on the one hand and the vibration damper on the other. However, the component used for disengaging is the coupling element.

There exist numerous possibilities of concretely designing and constructing the coupling element, with the latter having to effect a defined disengagement, when a thermal and/or mechanical load limit is exceeded. To this end, it would be possible to design and construct the coupling element as a spring, which loses at least in part its elasticity under a temperature influence above a predetermined limit value of the temperature, and disengages in this process. Thus, the coupling realized by elasticity is eliminated by a quasi "fatiguing" of the spring. In this connection, the spring may easily assume a double function, insofar as the spring also permits a disengagement, when a mechanical load limit is exceeded, namely, it acts in the fashion of a slipping clutch. Both modes of operation are possible, namely a disengagement when a thermal and a mechanical load limit are exceeded.

Likewise, it is possible to construct the coupling element as a permanent magnet cooperating with the magnetic material of the belt pulley body and coupling disk. This permanent magnet would have to loose its magnetic effect at least in part under a temperature influence above a predetermined limit value, and disengage in this process. In this respect, a disengagement would be ensured, when a definable, thermal load limit is exceeded.

The provision of a magnetically operating coupling device could also perform a formlocking engagement, namely in that the coupling element comprises magnetic coupling parts adapted for a formlocking engagement, as well as an at least weak electromagnet, which disengages the coupling parts, when a blocking of the drive shaft is detected. Such a provision presents itself at least when the compressor is electrically controlled, i.e., when it is easy to detect the blocking of the compressor.

Within the scope of a very advantageous development, the coupling element is designed and constructed in the way of an annular pressure body for a frictional engagement between the belt pulley body and the coupling disk or drive shaft. Due to its pressed state between the components, this pressure body effects a frictional engagement. In the case that a vibration damper is provided in addition, the coupling element and, thus, the pressure body are arranged between the belt pulley body and the vibration damper. At any rate, the pressure body is operative between the belt pulley body and the drive shaft, in each case via those components that are arranged therebetween from a functional viewpoint.

Concretely, the pressure body could be realized in the form of bellows, preferably thin-walled metal bellows. A thin-walled construction would be of advantage, inasmuch as same could be spatially expanded by a flow medium. For a frictional engagement, the pressure body could be filled with a flow medium under a predeterminable pressure. The flow medium may be a gas, a liquid, or at least in part a liquid and otherwise gas. At any rate, in its pressure-biased state, the pressure body effects an automatic engagement, so that the compressor is rotatably driven via the belt pulley body.

The provision of the above-described pressure body thus permits a disengagement, when a defined thermal and/or mechanical load limit is exceeded. To this end, the flow medium could exhibit such a high thermal coefficient of expansion that, upon exceeding a predetermined temperature, it opens the pressure body at least in sections due the then prevailing inside pressure, or even causes it to explode, and disengages it in this process. At any rate, this presumes that the belts slips over the belt pulley body, thereby heating it, in practice, to about 300° C., and that it transfers the temperature to the pressure body directly adjacent the inside surface of the belt pulley body. At any rate, the temperature increase leads to such an expansion of the flow medium that the pressure body leaks or even explodes, thereby allowing the pressure to escape, and discontinuing in the end the contact pressure that is applied by the pressure body and required for a forced engagement between the belt pulley body and drive shaft or coupling disk. Thus, a disengagement is realized, when a thermal load is exceeded.

Likewise, it is possible that the pressure body has at least one predetermined mechanical breaking point that is used for relieving pressure and, thus, for disengagement. To this end, a predetermined breaking point could tear, so that the pressure prevailing within the pressure body or the flow medium therein is able to escape. However, this will require that the force necessary for tearing be smaller than that force, which holds, by static friction, adhesion, or the like, the pressure body in its position relative to the coupling disk or to the vibration damper arranged therebetween. This would ensure a disengagement, when a mechanical load limit is exceeded.

Likewise, it would be possible that for purposes of relieving pressure and thus for disengaging, the pressure body comprises at least one safety fuse, which melts regardless of a possible pressure rise within the pressure body, when a predetermined temperature is reached, and releases the pressure medium. In a particularly advantageous manner a plurality of safety fuses are provided along the circumference of the pressure body, so that irrespective of the angular position of the belt pulley or belt pulley body, at least one safety fuse is arranged in the vicinity of the region of the belt pulley, which overheats due to a slipping of the belt. At any rate, this also creates an automatic disengagement, namely by exceeding a defined thermal load limit.

Since a malfunction of the compressor can lead both to a slipping of the belt and, thus, to an enormous heating of the belt pulley body and to a total blocking of the belt and, thus, to a choking of the drive engine, or even to a destruction of the belt, it will be of advantage to combine the two previously described disengagement mechanisms, namely to the extent that the pressure body may comprise for disengagement at least one predetermined mechanical breaking point serving to relieve pressure, and at least one safety fuse serving to relieve pressure. In this connection, it should be made sure that the pressure body be held in its position in a material-engaging manner, at least, however, with a high coefficient of static friction, so that the predetermined breaking point tears indeed under a corresponding mechanical load.

As regards a concrete realization of the pressure body, it will be of further advantage, when same extends annularly, preferably in the way of a hollow cylinder, between the inside surface of the belt pulley body and the outside surface of the coupling disk or a vibration damper. In other words, the pressure body extends annularly between the belt pulley body and the coupling disk, namely between the two inside surfaces of the components under discussion that are to be engaged. The vibration damper provided in this location may serve as a quasi intermediate element, but has nothing to do with engagement or disengagement in a functional respect.

In the longitudinal section of the compressor or the pressure body, same could have a substantially rectangular pressure chamber. Adjacent to this rectangular pressure chamber are outwardly directed separating regions of the pressure body, which narrow relative to the pressure chamber in the longitudinal section thereof. These separating regions have closely adjacent walls, which, due to their vicinity, are closed as a whole, in zones, or point by point, with a safety fuse. A connection of the walls in the separating regions can also be realized in the way of a predetermined breaking point.

In particular, when combining an automatic disengagement upon exceeding both a defined thermal and a defined mechanical load limit, it will be of advantage, when two opposite separating regions are formed, which adjoin the pressure chamber with their arm in U-shape in the longitudinal section of the pressure body. In this arrangement, the one separating region will serve for disengagement, when a defined thermal load limit is exceeded, and the other separating region, when a mechanical load limit is exceeded. In this connection, the one separating region is a safety fuse, and the other separating region a predetermined mechanical breaking point. Both the safety fuse and the preset breaking point may be provided along the entire circumference of the pressure body continuously, in zones, or only point by point.

BRIEF DESCRIPTION OF THE DRAWINGS

There now exist various possibilities of improving and further developing the teaching of the present invention. To this end, reference may be made to the following detailed description of several embodiments of the invention with reference to the drawing. In conjunction with the description of the preferred embodiments of the invention with reference to the drawing, also generally preferred embodiments and further developments of the teaching will be explained. In the drawing.

DETAILED DESCRIPTION OF THE PREFERRED EMBODIMENTS

Figure 1:
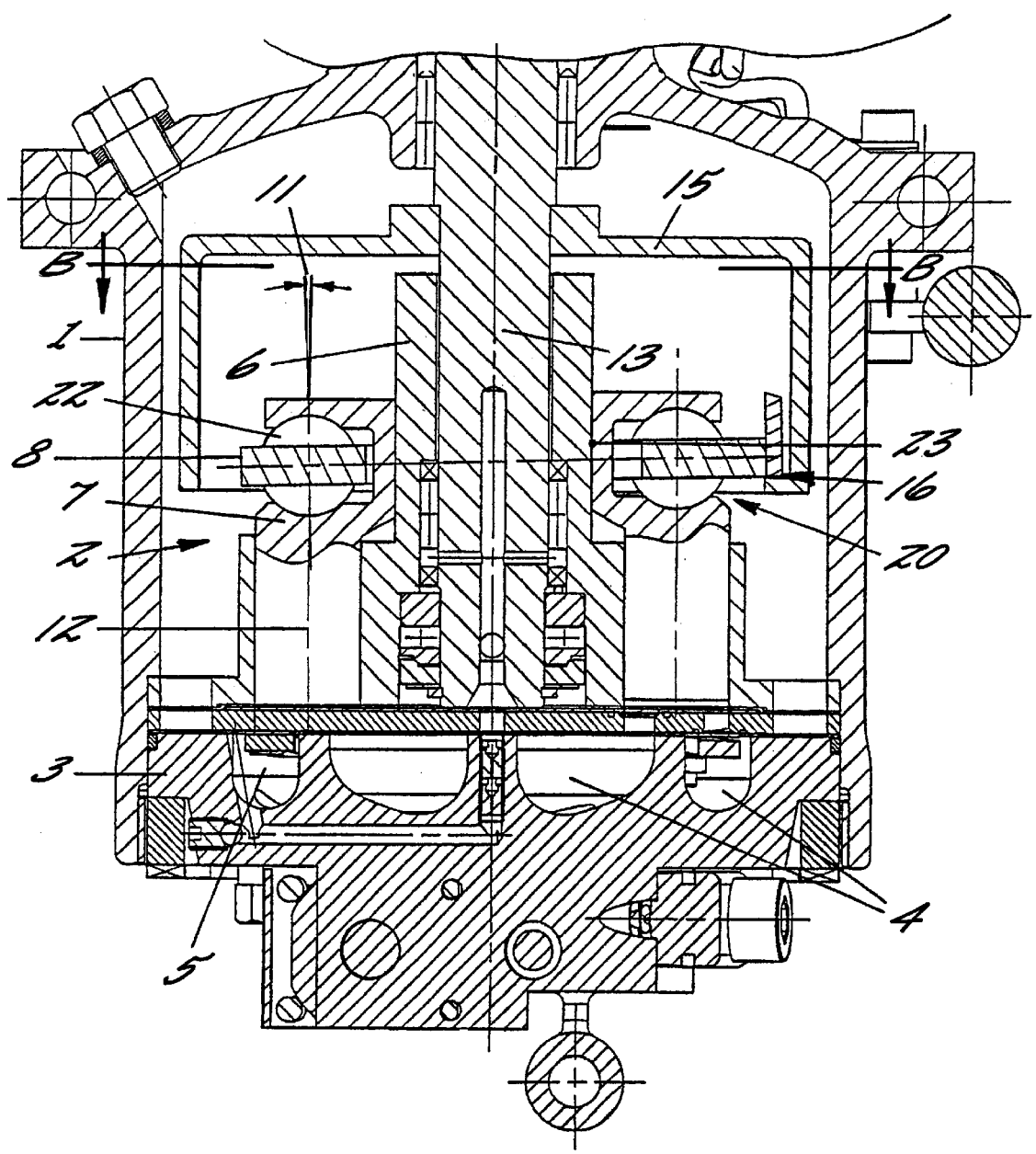
FIG. 1 is a schematic, longitudinally sectioned view of an embodiment of a compressor according to the invention, wherein a drive disk constructed as a pivot disk is inclined or pivoted by a minimum amount that is defined by a stop.
Figure 2:
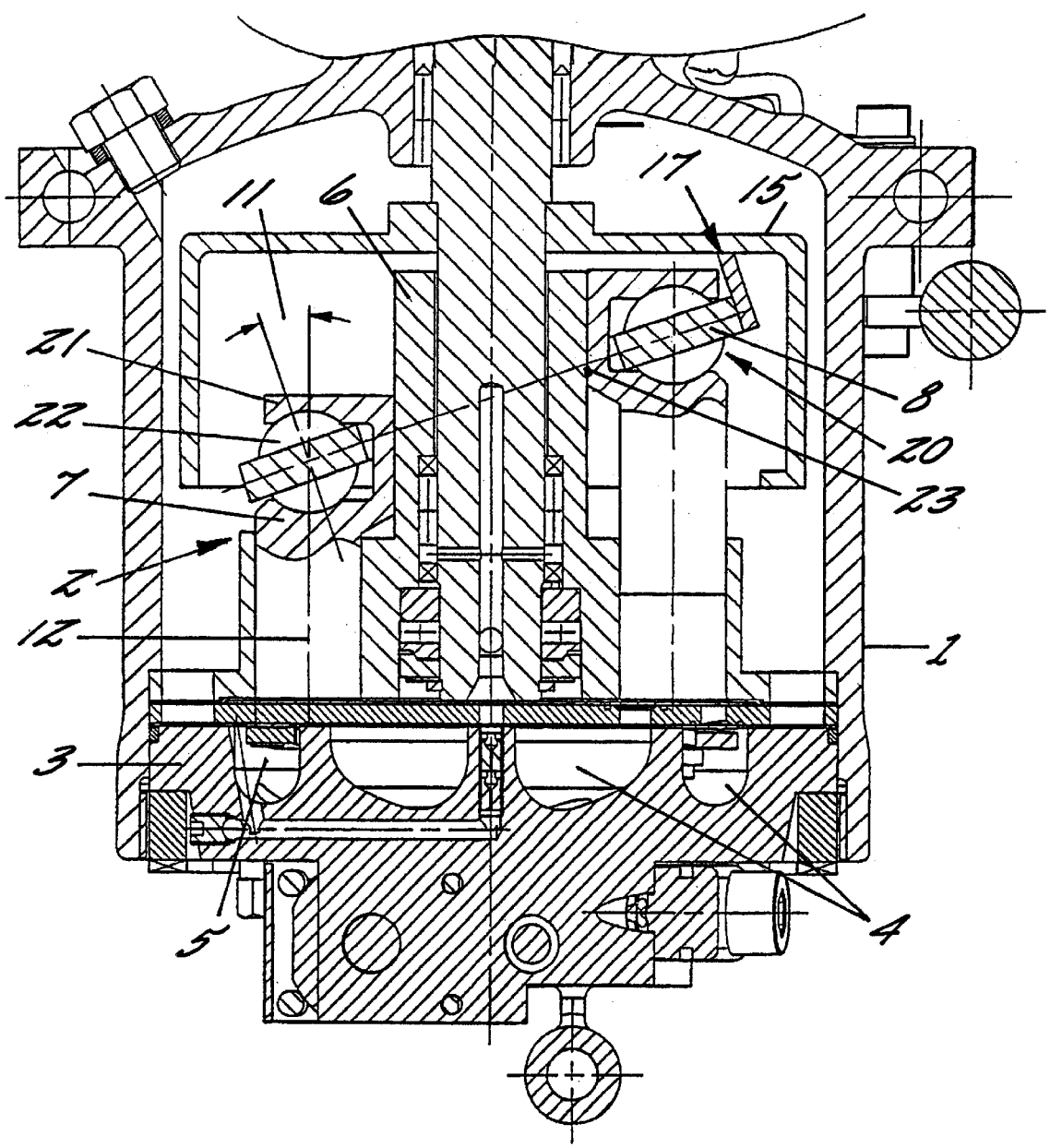
FIG. 2 illustrates the embodiment of FIG. 1, wherein the pivoting disk is inclined according to a stop defining a maximum pivotal movement.
Figure 3:
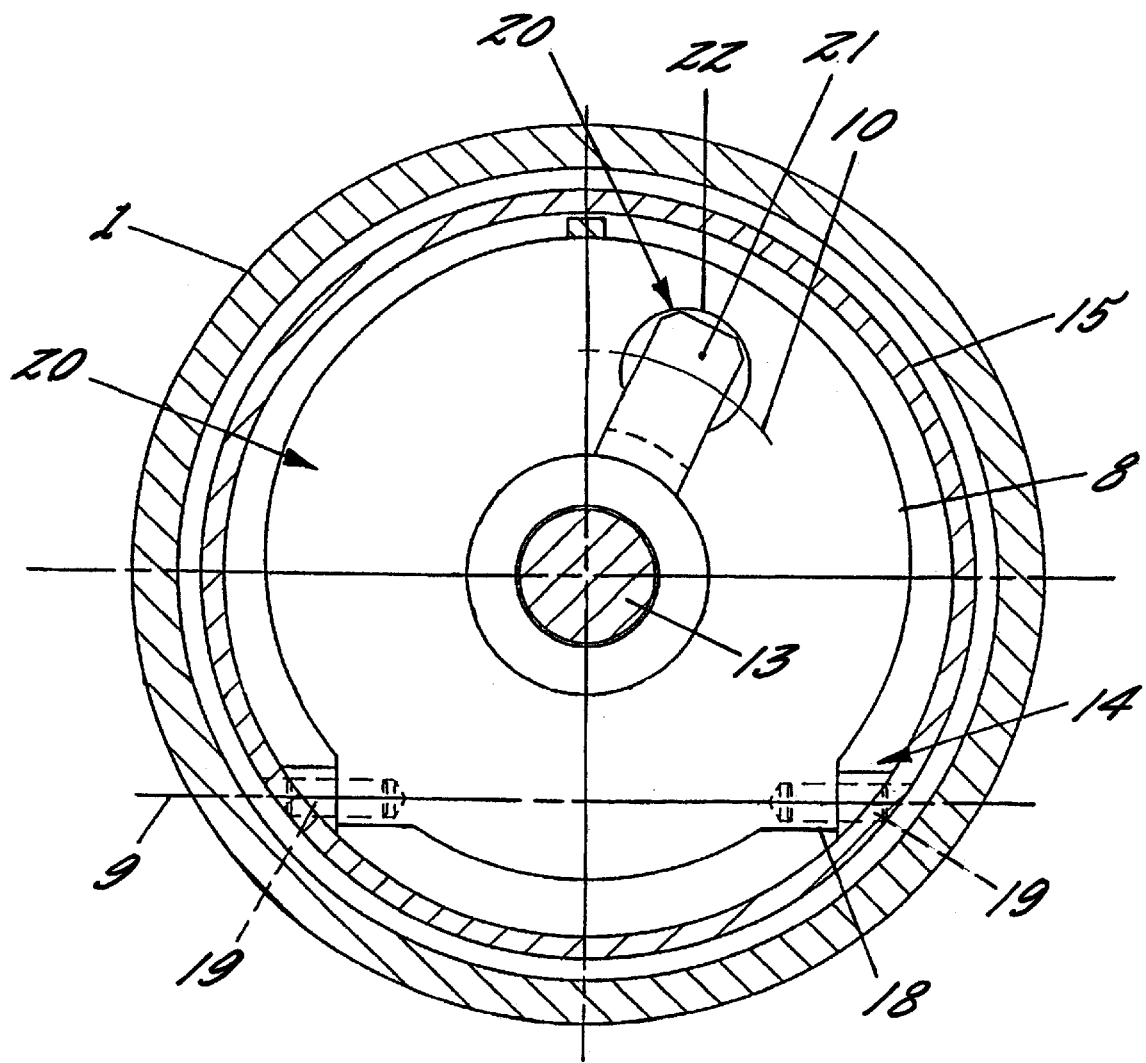
FIG. 3 is a cross sectional view of the embodiment of FIG. 1 along line B—B.

FIGS. 1–3 show a compressor for an air conditioning system of an automobile. The compressor comprises a housing 1 and a compressor unit 2 accommodated in the housing 1 for taking in and compressing a refrigerant. The refrigerant may be $CO_2$.

The refrigerant flows from an intake area 4 formed in a front-end housing cover 3 through the compressor unit 2 into a discharge area 5 likewise formed in the housing cover 3.

FIGS. 1 and 2 show very clearly the compressor unit 2 accommodated in housing 1 for taking in and compressing the refrigerant. The compressor unit 2 comprises pistons 7 reciprocating in a cylinder block 6 and a drive disk driving pistons 7. Concretely, the drive disk is a pivot disk 8.

In accordance with the invention, the pivot disk 8 is supported such that a center line 9 of the bearing mount, i.e. a pivot or bearing axis of pivot disk 8 forms a tangent to a reference circle 10 defining the stroke, so that an angle of inclination 11 of pivot disk 8 is variable without displacing the dead center above the stroke position. At any rate, FIGS. 1 and 2 show jointly that the pivot disk 8 tilts exactly above the longitudinal axis 12 of the piston, namely that the instantaneous pole lies on the reference circle 10, and is stationary when related to the rotating reference system of a drive shaft 13.

As clearly shown in FIG. 3, the pivot disk 8 is operatively connected to the drive shaft 13 via a coupling device 14 arranged in its edge region. To this end, the pivot disk 8 is jointed to an entraining member 15 that is nonrotatably connected to drive shaft 13. The entraining member 15 is a cylindrical body, which simultaneously forms a stop 16, 17 for the pivotal movement of pivot disk 8. This is best seen in particular in FIGS. 1 and 2, with FIG. 1 showing the stop 16 for a minimum pivotal movement and FIG. 2 the stop 17 for a maximum pivotal movement of pivot disk 8—with the respective position of pivot disk 8.

As further shown in FIG. 3, the pivot disk 8 is supported by means of pivot bearing 18 that is operative between the pivot disk 8 and entraining member 15. This pivot bearing 18 comprises bearing pins 19, which engage the entraining member 15 for pivotally jointing the pivot disk 8.

As can be noted from FIGS. 1–3 as a whole, coupling means 20 are operative between the pivot disk 8 and pistons 7. These coupling means 20 comprise a brace 21 associated to piston 7 and a slide shoe or spherical body 22 associated to pivot disk 8. In this arrangement, the brace 21 of piston 7 extends through the pivot disk 8 on the side facing the drive shaft 13, whence it extends outward with inclusion of spherical body 22, surrounding the latter at least in part.

FIGS. 1–3 only indicate that the cylinder block 6 comprises an antirotation device for the piston 7, namely in the form of a support surface 23 between the cylinder block 3 and piston 7.

Figure 4:
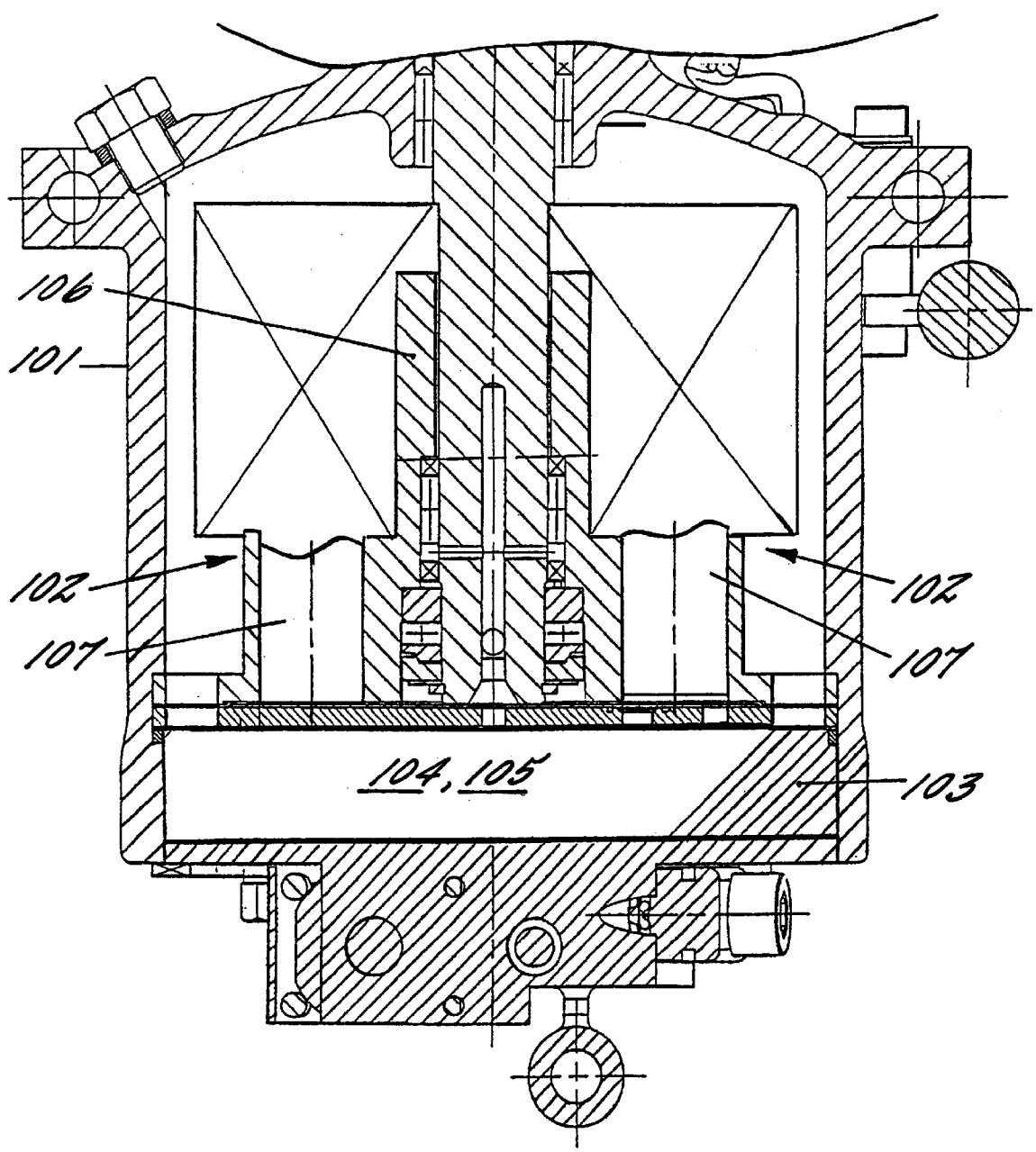
FIG. 4 is a schematic, longitudinally sectioned view of a further embodiment of a compressor according to the invention, wherein a compressor unit is merely indicated.

FIG. 4 shows a compressor for the air conditioning system of an automobile. The compressor comprises a housing 101 and a compressor unit 102 accommodated in the housing 101 and merely indicated in FIG. 4 for taking in and compressing a refrigerant. This refrigerant may preferably be $CO_2$.

The refrigerant flows from an intake area 104 formed in a front-end housing cover 103 through the compressor unit 102 into a discharge area 105 likewise formed in the housing cover 103. FIG. 4 only indicates the compressor unit 102 accommodated in the housing 101 for taking in and compressing the refrigerant. The compressor unit 102 comprises pistons 107 reciprocating in a cylinder block 106, and a drive disk driving the pistons 107. The drive disk is not shown in FIG. 4. Concretely, the drive disk is a pivot disk 108 (note FIGS. 5–8).

In accordance with the invention, the pivot disk 108 shown in FIGS. 5–8 is supported such that a center line 109 of the bearing mount, i.e. the pivot or bearing axis of pivot disk 108 forms a tangent to a reference circle 110 defining the stroke (note FIG. 7), so that an angle of inclination 111 of pivot disk 108 is variable, without displacing the upper dead center above the stroke position. At any rate, FIGS. 5–8 show jointly that the pivot disk 108 tilts exactly above the longitudinal axis 112 of the piston, namely that the instantaneous pole lies on the reference circle 110, and is stationary when related to the rotating reference system of drive shaft 113.

As best seen in FIGS. 5–8, the drive disk or pivot disk 108 is operatively connected to drive shaft 113 via a guide arm 114 rigidly connected to drive shaft 113 and mounted for sliding movement in the edge region of pivot disk 108. As further shown in FIGS. 5–8 together, the guide arm 114 is constructed as a square bar and arranged orthogonally to the longitudinal axis 115 of drive shaft 113. In the illustrated embodiments, the drive arm 114 is pressed into the drive shaft 113.

Figure 5:
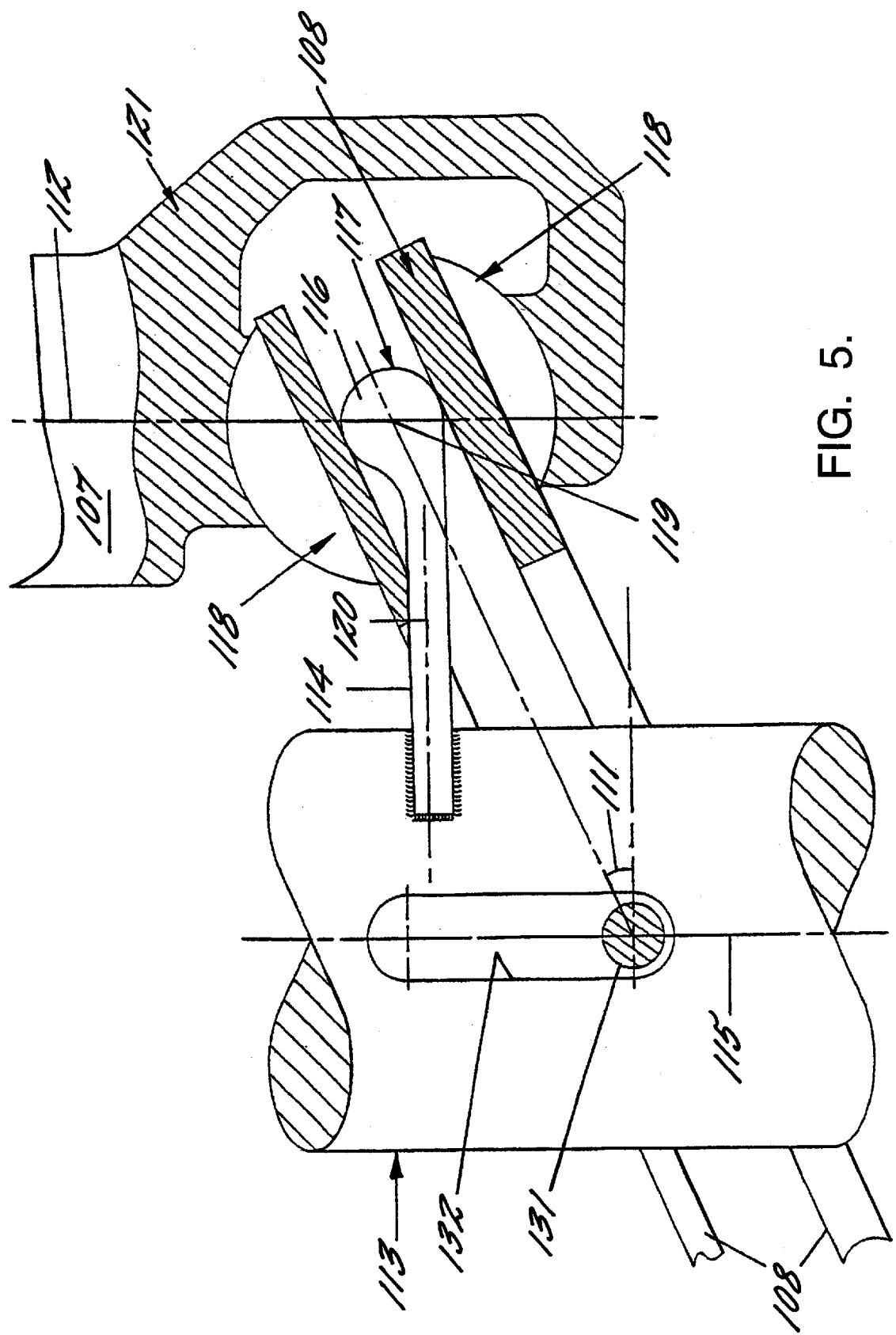
FIG. 5 is a schematic detail view of an operative connection between the drive shaft and piston, wherein the pivot disk is maximally pivoted.
Figure 6:
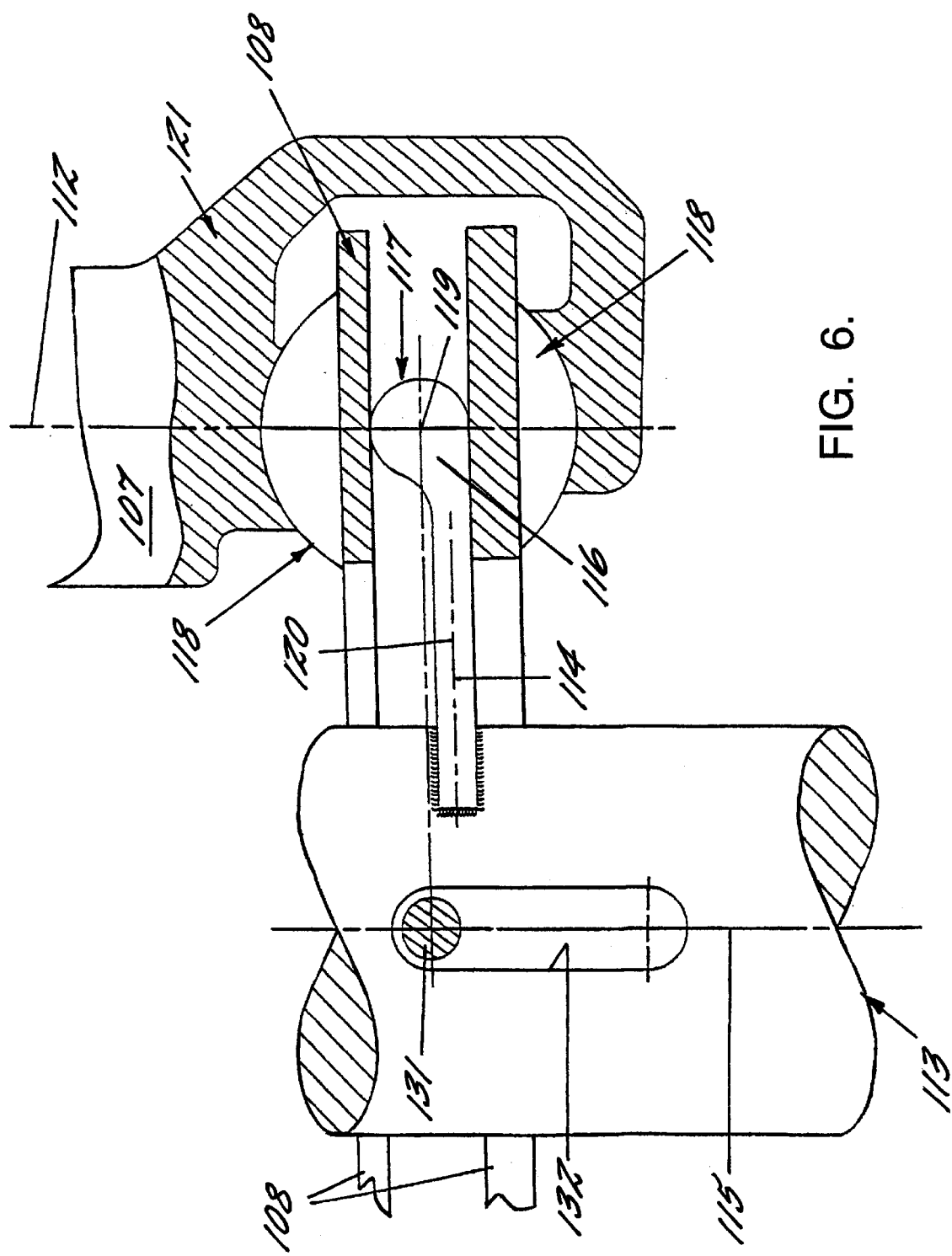
FIG. 6 illustrates the embodiment of FIG. 5, wherein the pivoting disk is inclined or pivoted by the minimal amount.
Figure 8:
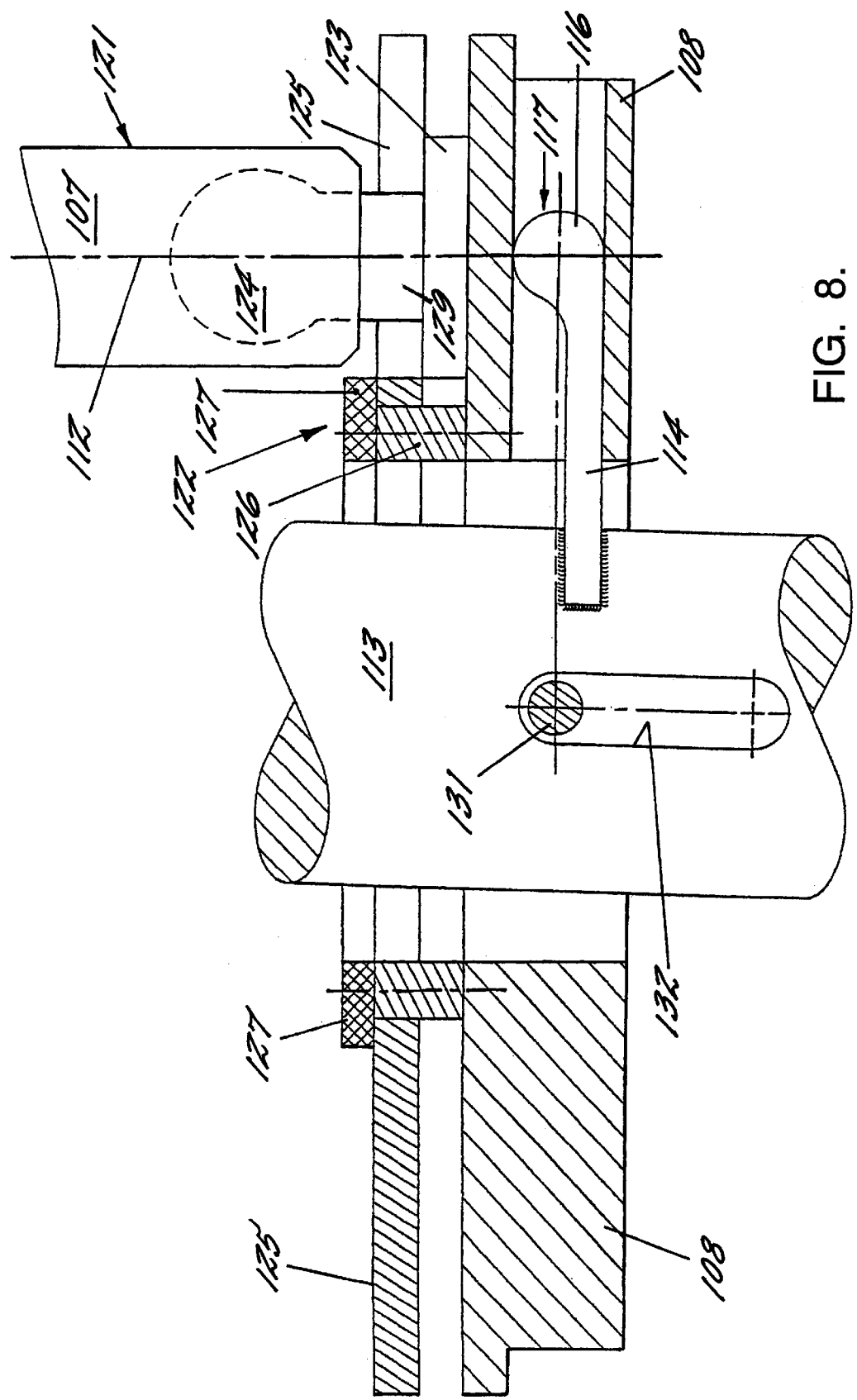
FIG. 8 is a detail view according to the illustration of FIG. 6 showing a further embodiment of the compressor according to the invention, wherein a friction bearing is operative between the piston and a swash plate.

As very clearly illustrated in FIGS. 5, 6, and 8, a guide member 116 is formed at the free end of guide arm 114 for a sliding support of the guide arm 114 in pivot disk 108. The guide member 116 is constructed substantially cylindrical crosswise to the longitudinal axis of guide arm 114.

In the illustrated embodiments, the guide member 116 is directly supported in pivot disk 108. An indirect bearing mount via other bearing/slide mechanisms is possible. At any rate, the guide member 116 with its surface 117 serves for a sliding contact with opposite inside walls of the pivot disk 108, as can very clearly be noted from FIGS. 5, 6, and 8.

Figure 7:
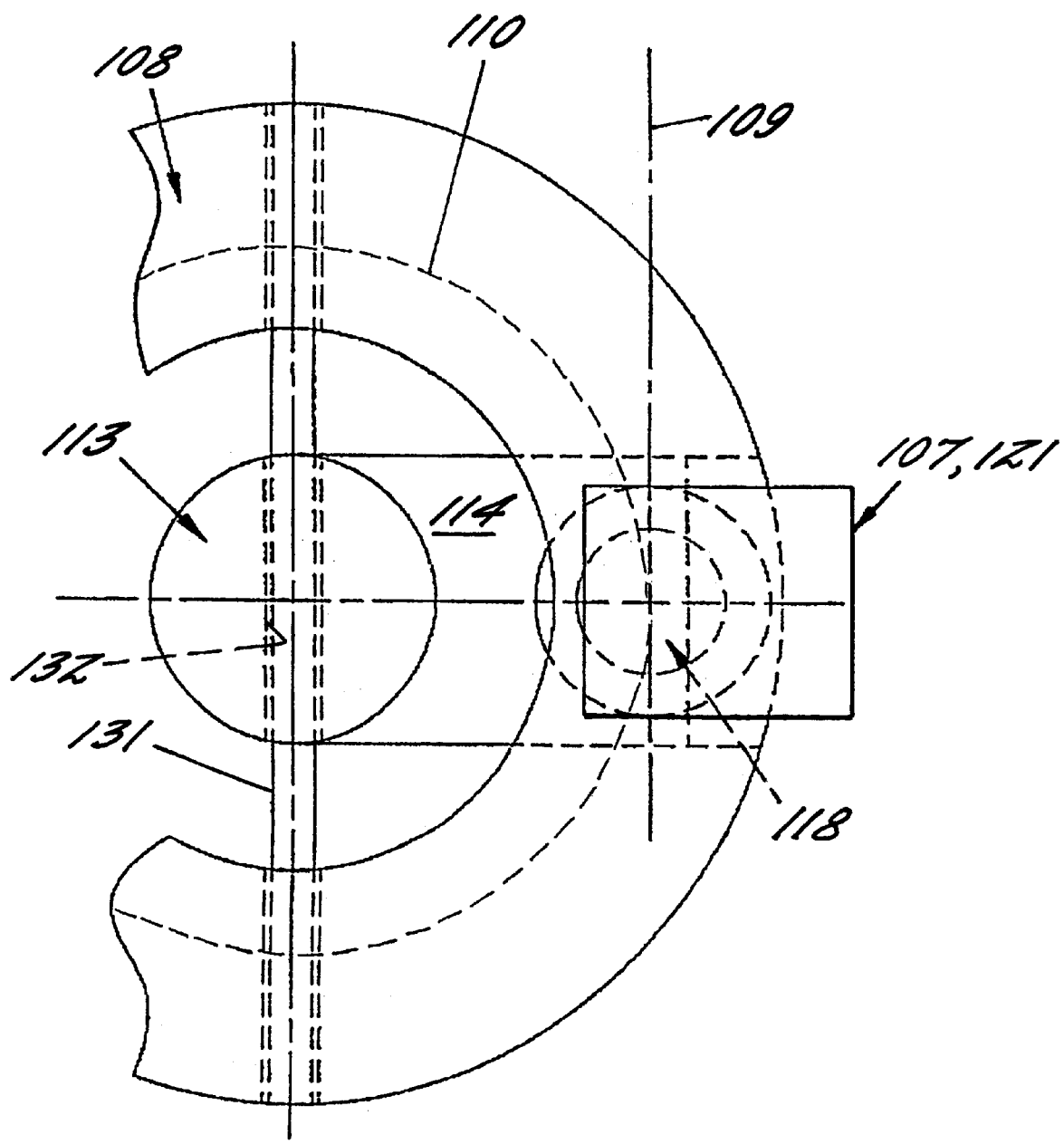
FIG. 7 is a partial, schematic top view of the jointed engagement between the drive shaft and piston including the pivoting disk.

In the embodiment shown in FIGS. 5, 6, and 7, spherical segments 118 are provided in the effective range of guide member 116 on both sides of pivot disk 108 for a pivotal engagement in piston 107. The center of the ball formed by the two spherical segments 118 lies in the center of the cylindrical guide member 116 or on its longitudinal axis 120.

As further shown in FIGS. 5 and 6, the piston 107 extends with its connecting region 121 over the free end of pivot disk 108 to engage spherical segments 118. The connecting region 121 has a C-shaped cross section, so that it is possible to engage over the free end of pivot disk 108.

Figure 9:
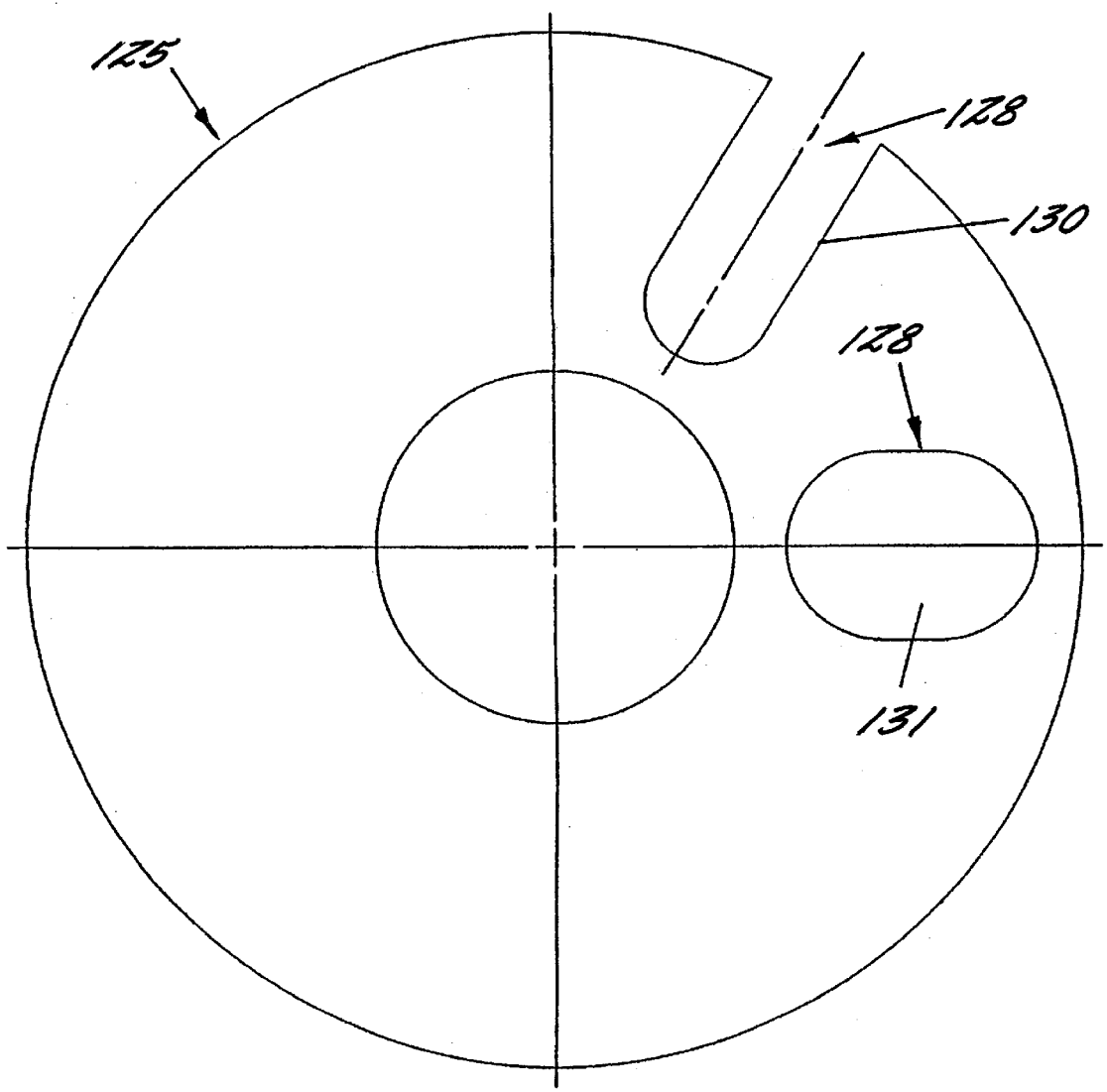
FIG. 9 is a schematic top view of a depressor as is used in the embodiment of FIG. 8.

FIGS. 8 and 9 show a further embodiment of a compressor according to the invention. These Figures show only details, as are also illustrated in FIGS. 5 and 6 with respect to the foregoing embodiment.

Accordingly, the pivot disk 108 is operatively connected via a friction bearing 122 to the piston 107 that mounts at its end a slide shoe 123. The piston 107 is constructed as a cylindrical solid body, with the slide shoe 123 connecting to the piston 107 by means of a spherical joint 124, which permits a tilting of slide shoe 123.

Concretely, the slide shoe 123 is held or pushed onto pivot disk 108 by means of a depressor 125. As shown in FIG. 9, the depressor 125 is constructed in the form of a disk and nonrotatably mounted. Between the depressor 125, the slide shoe 123, and the pivot disk 108, friction bearing 122 is operative. To this end, the friction bearing 122 comprises a spacer ring 126 extending between the pivot disk 108 and depressor 125 and a depressor guideway 127 adjacent spacer ring 126 and extending in part over the depressor 125.

FIG. 9 only indicates that the depressor 125 comprises for the piston 107 or for a connection 129 between the spherical joint 124 and slide shoe 123, passageways 128 in an amount corresponding to the number of pistons 107. The passageway 128 may be designed and constructed as a slot 130 terminating at the edge of depressor 125 or as a laterally closed, elongate hole 131 that increases the rigidity of depressor 125.

As further clearly shown in FIGS. 5–8, a guide pin 131 rigidly connected to pivot disk 108 engages an elongate hole 132 formed in pivot disk 108 for an axial guidance thereof. In so doing, the guide pin 131 extends through the elongate hole 132 and connects to pivot disk 108 on both sides thereof, as best seen in FIG. 7.

Figure 10:
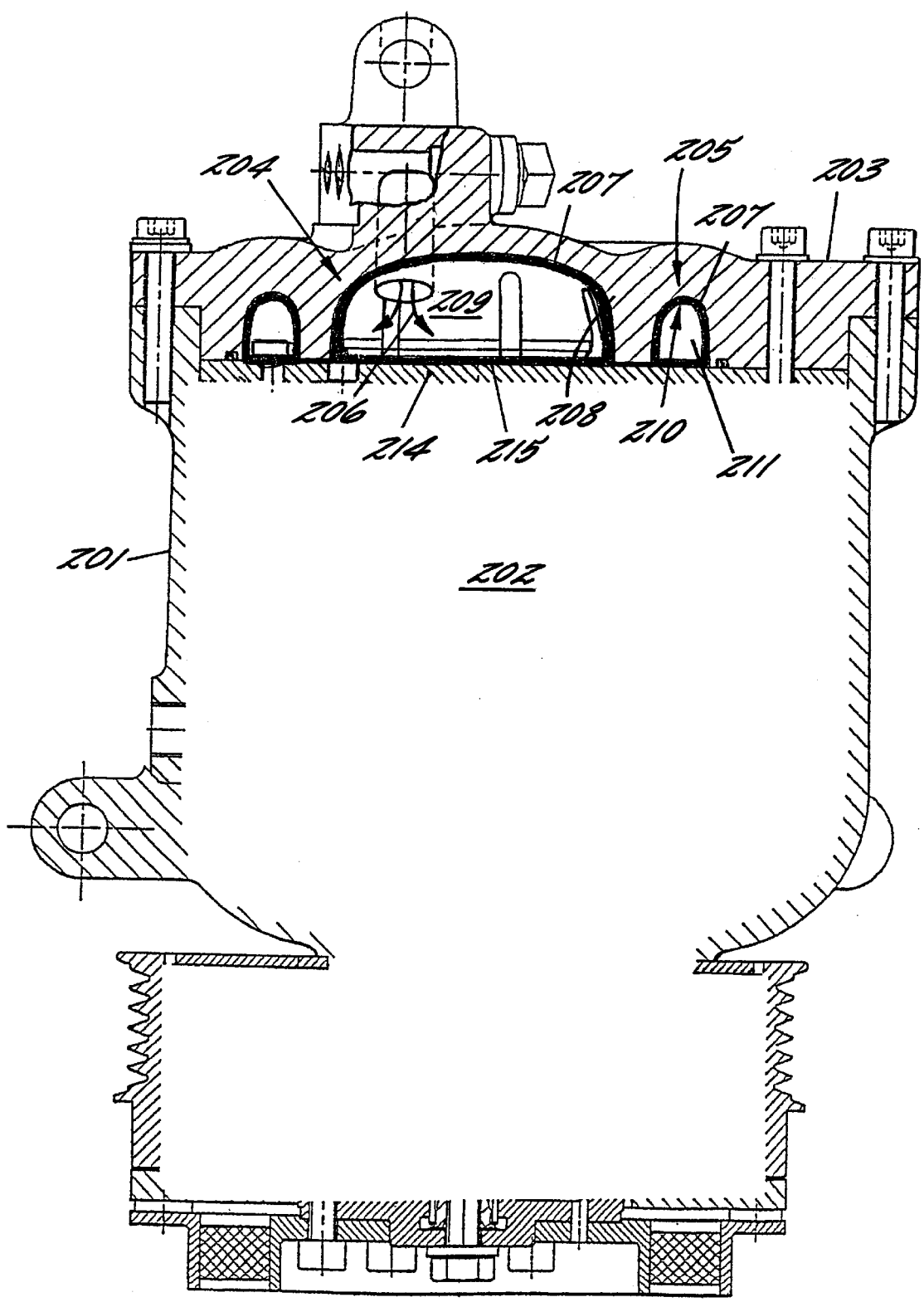
FIG. 10 is a partial and sectional schematic side view of an embodiment of a compressor according to the invention, the Figure showing only an intake area and a discharge area in a housing cover.

FIG. 10 shows a compressor for an air conditioning system of an automobile. The compressor comprises a housing 201 and a compressor unit 202 accommodated in the housing 201 for taking in and compressing a refrigerant. The refrigerant may be $CO_2$.

The refrigerant flows from an intake area 204 formed in a front-end housing cover 203 through the compressor unit 202 into a discharge area 205 likewise formed in the housing cover 203.

In accordance with the invention, components of the compressor that come into contact with the refrigerant, namely the walls that form a flow path 206 between intake area 204 and discharge area 205, are thermally insulated against the refrigerant at least in areas of contact.

In the embodiment illustrated in FIG. 10, a thermal insulation 207 is realized as a coating of a material having a low thermal conductivity. The thermal insulation 207 is provided both on the inside wall 208 of an intake channel 209 and on the inside wall 210 of a discharge channel 211. More specifically, the entire inside walls 208, 210 of the intake area 204 are coated in a thermally insulating manner. Ultimately, the entire inside walls 208, 210 of the housing cover 203 are coated to this end.

Figure 11:
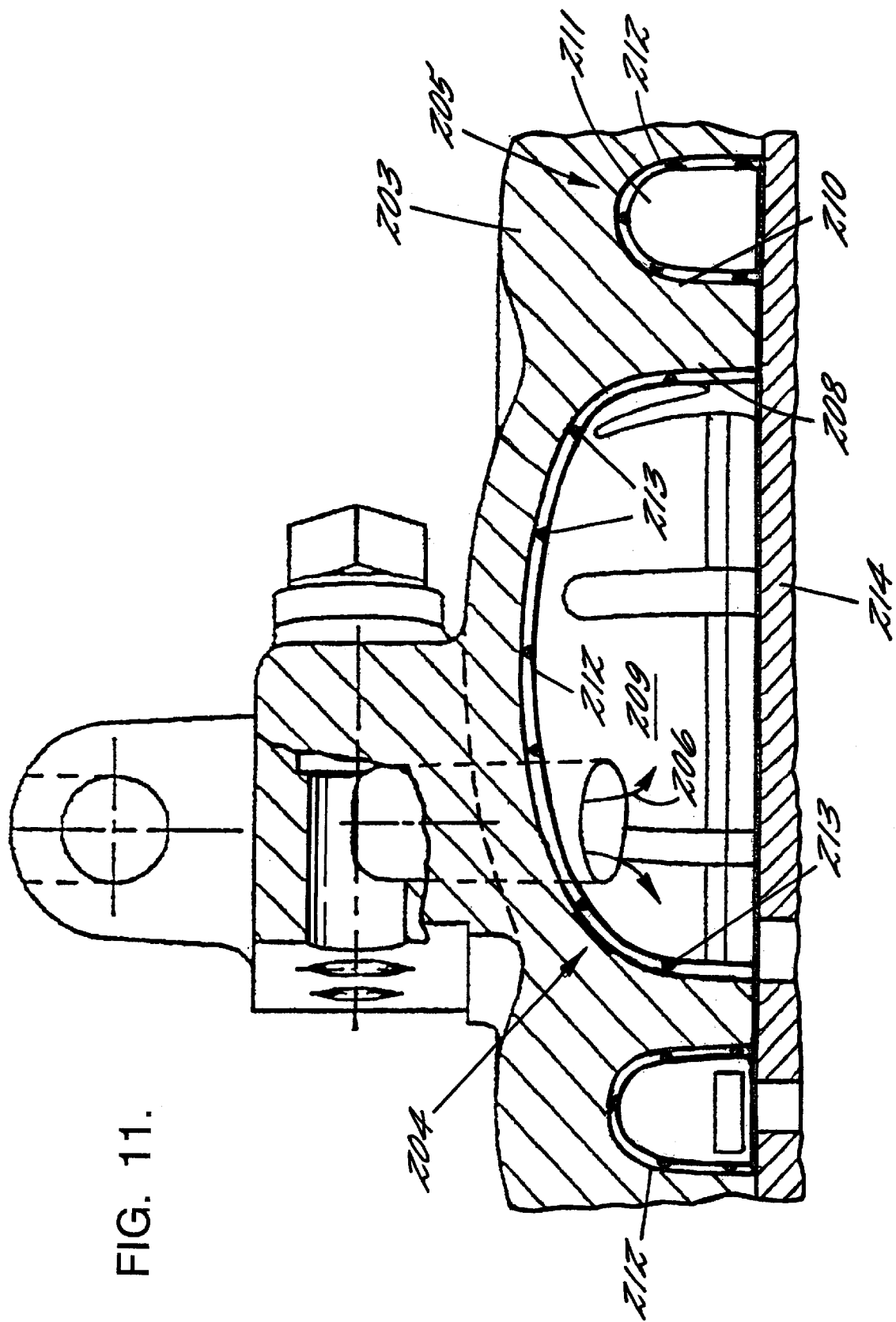
FIG. 11 is an enlarged sectional side view of the intake area in the housing cover, wherein a lining is provided as a thermal insulation in spaced relationship with the inside wall of the housing cover.

In the embodiment partially and schematically illustrated in FIG. 11, it is indicated for the intake area 204 that the inside walls 208, 210 of housing cover 203 are there lined in the form of a loose insert 212. This insert 212 is slightly spaced from the inside walls 208, 210. This spaced relationship is implemented by integral spacers 213, which lie directly against the inside walls 208, 210 of housing cover 203.

As can further be noted from FIG. 10, the housing cover 203 adjoins a valve plate 214. A thermal insulation is likewise provided on valve plate 214, the latter being coated on its side facing the housing cover 203, preferably with the same material as the inside walls 208, 210 of housing cover 203. In this respect, the flow path formed between housing cover 203 and valve plate 214 is totally coated and thus thermally insulated.

With respect to the thermally insulating and wear-resistant coating of further components of the compressor, the general part of the specification is herewith incorporated by reference for purposes of avoiding repetitions. The same applies to the material of housing cover 203.

Figure 12:
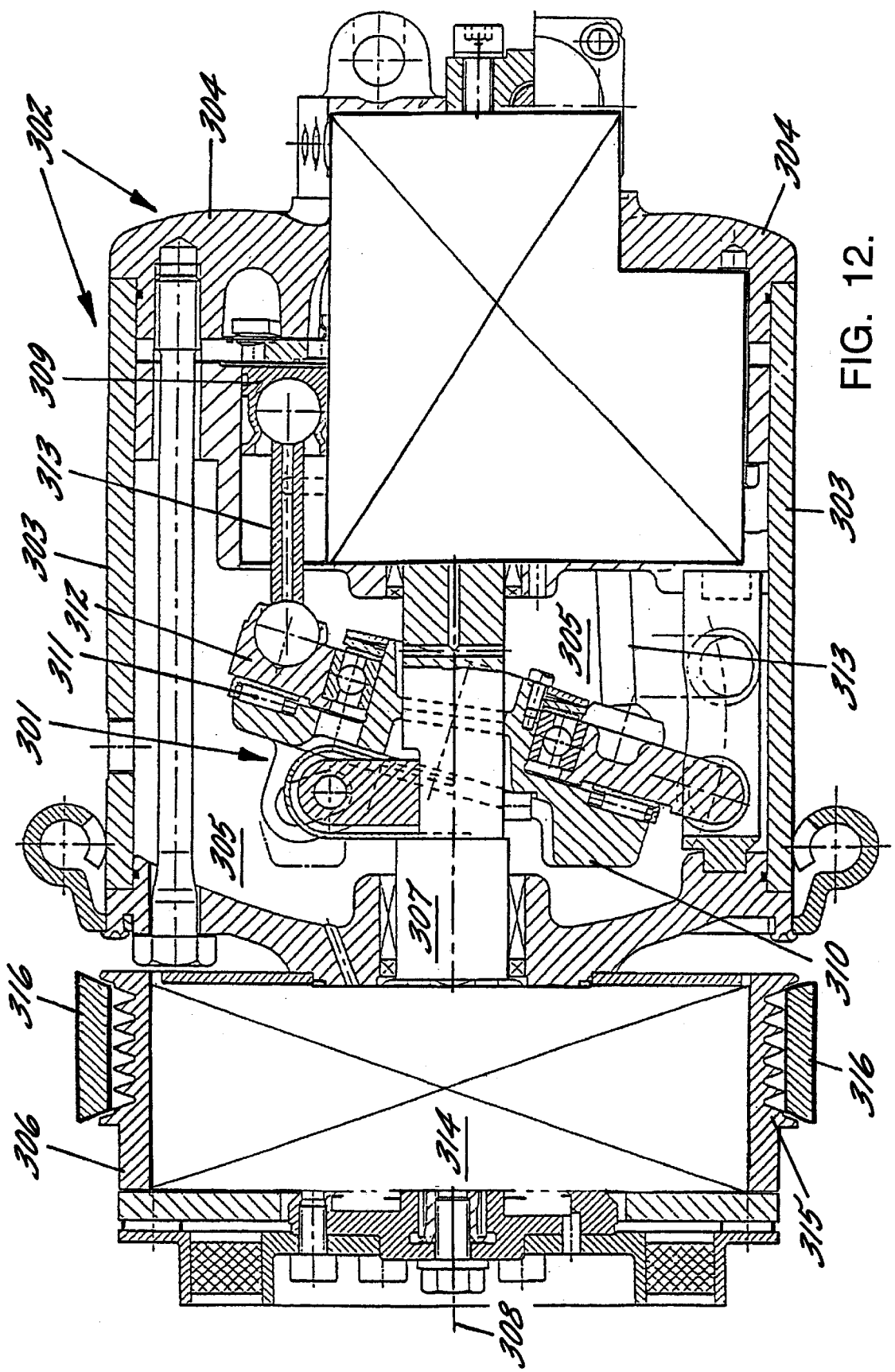
FIG. 12 is a schematic, longitudinally sectioned view of an embodiment of a species-forming compressor with the essential components.

The embodiment of a species-forming compressor as shown only by way of example in FIG. 12, is an axial piston compressor. In this embodiment, a compressor unit 301 not described in greater detail is accommodated in a housing 302. The housing 302 essentially comprises two housing parts 303, 304, with the housing part 303 forming a so-called drive chamber 305 that accommodates the compressor unit 301.

For example, an internal combustion engine drives the compressor unit 301 via a belt pulley 306. From there, the drive is effected via a drive shaft 307 that rotates about an axis of rotation 308. The drive shaft 307 is rotatably supported in the housing 302 and in the region of the belt pulley 306.

To drive pistons 309, a swash plate 310 is provided which acts via bearings 311 upon a receiving disk 312 nonrotatably mounted in housing 302. The receiving disk 312 engages, via a connecting rod 313, the piston or pistons 309. According to this arrangement, the piston 309 reciprocates, upon a rotation of swash plate 310, via receiving disk 312, in direction of its longitudinal axis, with the illustrated embodiment comprising a plurality of pistons 309.

Since the compressor illustrated in the Figure is a compressor for an air conditioning system of an automobile, it is driven by the internal combustion engine of an automobile not shown. In this instance, a driving moment is introduced to a drive wheel 314 of the compressor via a suitable belt pulley that connects to the crankshaft of the internal combustion engine. This drive wheel 314 comprises a belt pulley body 315, which guides a belt 316.

As indicated in the illustration of FIG. 12, the belt pulley body 315 is put into rotation by belt 316. In the embodiments shown in FIGS. 13–16, the torque introduced into belt pulley body 315 is transmitted via a coupling device 317 to the drive shaft 307. In the selected embodiments, the coupling device 317 comprises a vibration damper 318.

In accordance with the invention, the coupling device 317 is designed such that upon exceeding a defined thermal and/or mechanical load limit, it automatically disengages, so that the belt pulley body 315 is able to rotate unimpeded in its disengaged state.

As best seen in FIGS. 13–16, the coupling device 317 comprises a coupling element 320 that is operative between the belt pulley body 315 and drive shaft 307 or a coupling disk 319. In this arrangement, the coupling element 320 extends between the inside surface of belt pulley body 315 and the outside surface of coupling disk 319, and the two surfaces—inside surface of belt pulley body 315 and outside surface of coupling disk 319—are arranged in coaxial relationship with each other.

As previously stated, a vibration damper 318 for damping rotational vibrations, which is associated to the coupling device 317, is provided between the coupling element 320 and coupling disk 319, or between the two adjacent surfaces of these components. This vibration damper has nothing to do with the actual engagement and disengagement procedures.

As further shown in FIGS. 13–16, the coupling element 320 is designed and constructed in the fashion of an annularly constructed pressure body 321 for frictionally engaging the belt pulley body 315 and coupling disk 319. Concretely, the pressure body 321 is a thin-walled metal bellows, which is filled for a frictional engagement with a flow medium under a predeterminable pressure. The clamping effect caused by the pressure body 321 effects the engagement between belt pulley body 315 and coupling disk 319. In this connection, the pressure body 321 can be secured in its position by gluing, soldering, spot welding, or the like.

Figure 13:
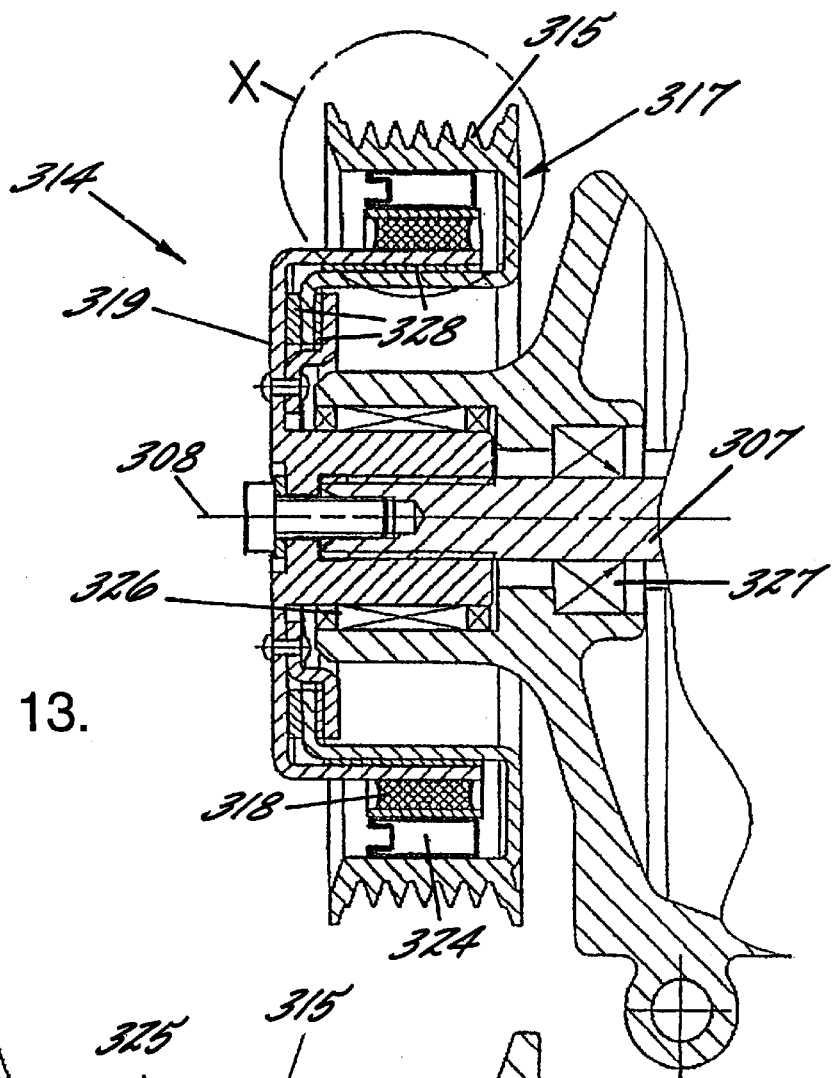
FIG. 13 is a partial, longitudinally sectioned schematic view of a further embodiment of a compressor according to the invention with a special belt pulley arrangement.
Figure 14:
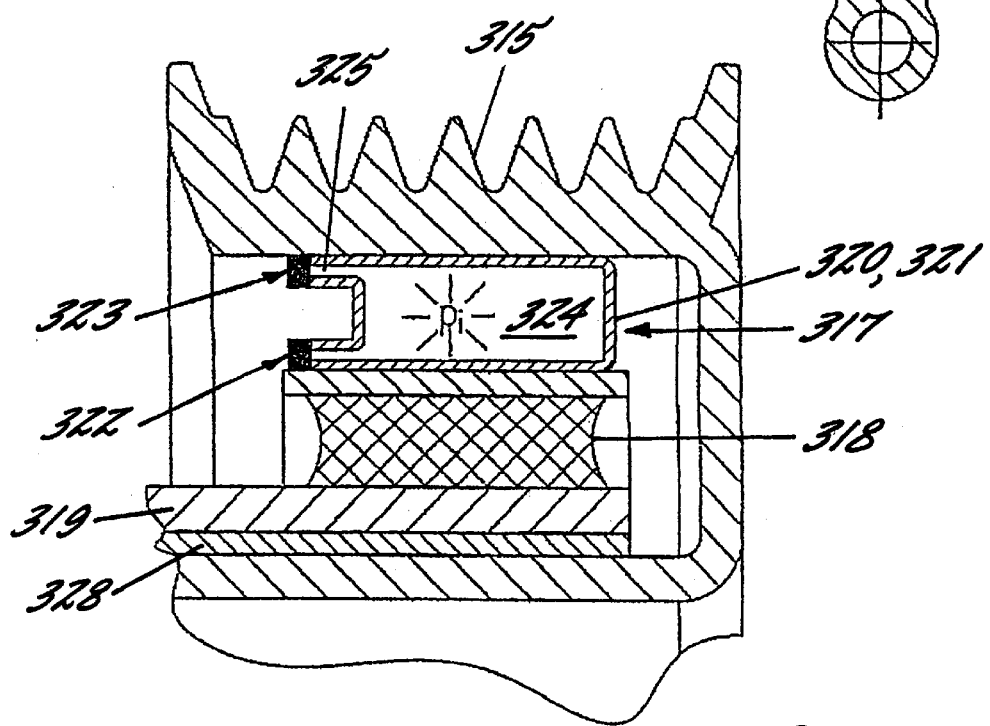
FIG. 14 is an enlarged view of detail "X" of FIG. 13.

As can be noted from the enlarged view of FIG. 14, the pressure body 321 comprises predeterminable breaking points, which are used for relieving pressure and, thus, for disengagement. Likewise at these points, safety fuses 323 are provided, so that in the embodiment shown in FIGS. 13 and 14, a combination of a coupling device 317 is realized, which automatically disengages when both a defined thermal load limit and a defined mechanical load limit are exceeded.

Figure 15:
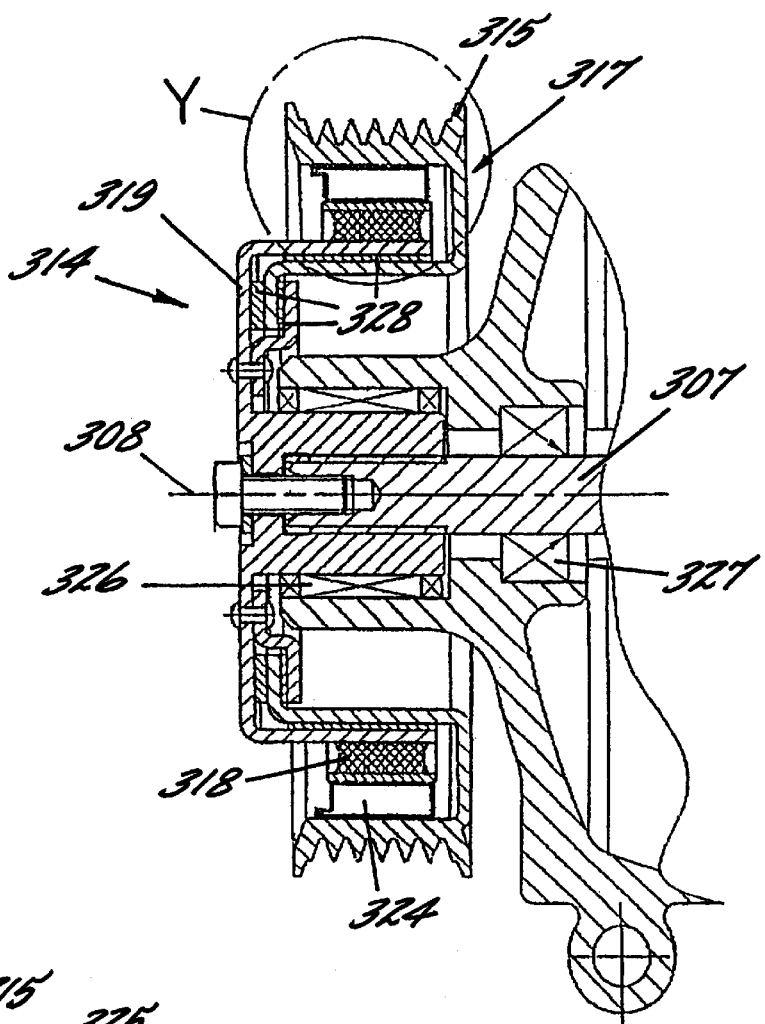
FIG. 15 is a partial, longitudinally sectioned schematic view of a further embodiment of a compressor according to the invention with a belt pulley arrangement.
Figure 16:
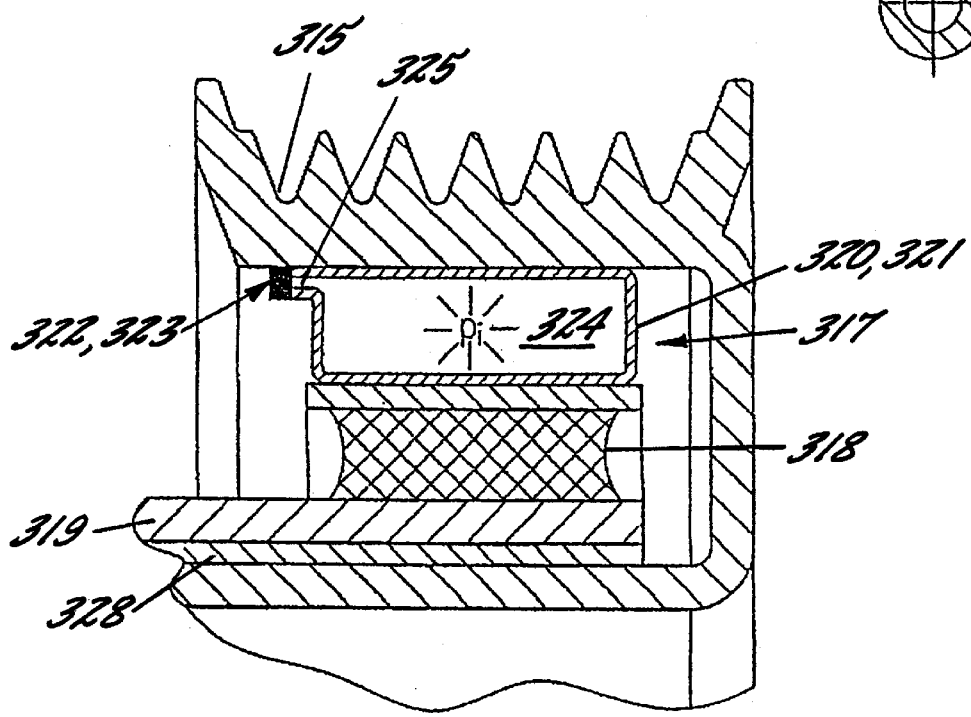
FIG. 16 is an enlarged view of detail "Y" of FIG. 6.

In the embodiment shown in FIGS. 15 and 16, the predetermined mechanical breaking points 322 and the safety fuses 323 are not located opposite to each other as in the embodiment shown in FIGS. 13 and 14, but are formed only on the side of pressure body 321 that faces the inside surface of belt pulley body 315.

Furthermore, as jointly shown in FIGS. 13–16, the pressure body 321 comprises a pressure chamber 324 substantially rectangular in its longitudinal section, and adjoining, outwardly directed separating regions 325 that cross sectionally narrow relative to the pressure chamber 324. In the embodiment shown in FIGS. 13 and 14, two separating regions are arranged in facing relationship, which connect in the longitudinal section of pressure body 321, with their arms in U-shape to the actual pressure chamber 324.

In the embodiment shown in FIGS. 15 and 16, only one side of the pressure body 321—the side facing the inside surface of belt pulley body 315—is provided with a separating region 325, which comprises both the predetermined mechanical breaking points 322 and the safety fuses 323.

Furthermore, it should be noted that, as shown in FIGS. 13 and 15, needle bearings 326 are provided, which support the drive shaft 307 outside of drive chamber 305. Moreover, the needle bearings 326 are used to support the coupling disk 319. Since the needle bearings 326 are arranged outside of the drive chamber 305, they operate under ambient atmospheric pressure, with seals 327 sealing against the drive chamber 305.

Finally, as can be noted from FIGS. 13 and 15, friction linings 328 are provided between the belt pulley body 315 and the coupling disk 319, which serve as "safety bearings" or as a bearing surface or bearing coating, inasmuch as, should the compressor block and a disengagement occur according to the foregoing description, the foregoing needle bearings 326 will also be inoperative. To the end that the belt pulley body 315 is able to rotate unimpeded over an acceptable period of time, for example for at least some hours, a kind of safety bearing is needed for the belt pulley body 315. This safety bearing is provided by the friction lining 328 that extends both radially and transversely. For this purpose, it is possible to use temperature-resistant materials.

As regards the operation of the realized coupling device, the general part of the specification is herewith incorporated by reference for purposes of avoiding repetitions.

The claims accompanying the application are proposed formulations without prejudice for obtaining a further reaching patent protection. Applicant reserves itself the right to claim still further characteristics that have so far been disclosed only in the specification and/or the drawings.

The dependencies claimed in the dependent claims refer to the further development of the subject matter of the independent claim by the characteristic features of the respective dependent claim; they should not be construed a waiver of obtaining an independent, valid protection for the characteristic features of the dependent claims.

However, the subject matters of these dependent claims also form independent inventions, which contain a development independent of the subject matters of the preceding dependent claims.

Likewise, the invention is not limited to an embodiment or the embodiments of the specification. Rather, within the scope of the invention, numerous changes and modifications are possible, in particular such variants, elements, and combinations, and/or materials, which are inventive, for example, by combining or modifying individual features, or elements, or method steps described in conjunction with the general specification and embodiments, as well as contained in the claims and drawing, and which result by combinable features in a new subject matter, or new method steps, or sequences of method steps, even to the extent that they relate to production, testing, and working methods.

As regards further advantageous developments of the present invention, which are not shown in the Figures, the general part of the specification is herewith incorporated by reference for purposes of avoiding repetitions.

Finally, it should be noted that the above-described embodiments given by way of example merely describe in greater detail the teaching of the invention, without however limiting it to the embodiments.

What is claimed is:

1. A variable displacement compressor adopted for use with an air conditioning system of an automobile, comprising a housing and a compressor unit accommodated within the housing for taking in and compressing a refrigerant, said compressor unit comprising a drive shaft, a plurality of pistons mounted for reciprocation along respective longitudinal axes in a cylinder block and so as to define an upper dead center of the stroke of each of the pistons, and with the longitudinal axes of the pistons being parallel to the drive shaft and disposed in a circular arrangement about said drive shaft to define a reference circle, and a drive disk slideably coupled to each of the pistons and connected for rotation with the drive shaft via a coupling device which is positioned adjacent an edge region of the drive disk and which is pivotable about a pivotal connection which defines a pivotal axis which forms a tangent to the reference circle, so that an angle of inclination of the drive disk about said pivotal axis is variable without significantly displacing the upper dead center of the stroke of the pistons, said coupling device including an entraining member that is fixedly connected to the drive shaft and which includes a cylindrical segment which at least partly surrounds the drive disk, and wherein the pivotal connection comprises a pivot bearing which is connected between the drive disk and the entraining member.

2. The compressor as defined in claim 1 wherein the entraining member includes a pair of stops for limiting the maximal and minimal pivotal movement of the drive disk.

3. The compressor as defined in claim 1 wherein the drive disk is slideably coupled to each of the pistons by means of a brace fixed to each piston and a spherical member fixed to the drive disk and slideably engaging the brace of each piston.

4. The compressor as defined in claim 3 wherein the brace of each piston includes a segment which extends through a central opening in the drive disk and a segment which engages the spherical member.

5. The compressor as defined in claim 4 wherein the brace of each piston engages the cylinder block so as to preclude relative rotation therebetween.

6. The compressor as defined in claim 1 wherein each piston mounts a slide shoe, and wherein the disk drive is operatively connected to the slide shoe of each of the pistons via a friction bearing.

7. The compressor as defined in claim 6 wherein each slide shoe is mounted to its associated piston by means of a spherical joint.

8. The compressor as defined in claim 7 further comprising a nonrotatably mounted depressor for holding each slide shoe on the drive disk, the depressor being in the form of a circular disk having a passageway for receiving each piston.

9. The compressor as defined in claim 8 wherein the friction bearing comprises a spacer extending between the drive disk and the depressor, and a depressor guideway adjacent to the spacer and extending at least in part over the depressor.

10. The compressor as defined in claim 1 wherein the drive disk mounts a guide pin positioned to extend through an elongate hole formed in the drive shaft.

11. The compressor as defined in claim 1 wherein the compressor further comprises a cover connected to said housing, said cover having an intake area and a discharge area forming a flow path for the refrigerant, with the inside walls of the flow path being thermally insulated.

12. The compressor as defined in claim 1 wherein the compressor further comprises a drive wheel coupled to the drive shaft, the drive wheel comprising a belt pulley body adapted to engage a drive belt, with the belt pulley body being connected to the drive shaft via a coupling device which automatically disengages when a predetermined thermal and/or mechanical load limit is exceeded.

13. The compressor as defined in claim 12 wherein the coupling device includes a vibration damper for damping rotational vibration.

14. A variable displacement compressor adopted for use with an air conditioning system of an automobile, comprising a housing and a compressor unit accommodated within the housing for taking in and compressing a refrigerant, said compressor unit comprising a drive shaft, a plurality of pistons mounted for reciprocation along respective longitudinal axes in a cylinder block and so as to define an upper dead center of the stroke of each of the pistons, and with the longitudinal axes of the pistons being parallel to the drive shaft and disposed in a circular arrangement about said drive shaft to define a reference circle, and a drive disk slideably coupled to each of the pistons and connected for rotation with the drive shaft via a coupling device which is positioned adjacent an edge region of the drive disk and which is pivotable about a pivotal connection which defines a pivotal axis which forms a tangent to the reference circle, so that an angle of inclination of the drive disk about said pivotal axis is variable without significantly displacing the upper dead center of the stroke of the pistons, said coupling device including a guide arm which is fixed to the drive shaft so as to extend radially therefrom, with said guide arm having a free end which is positioned for sliding engagement with the drive disk about said pivotal axis.

15. The compressor as defined in claim 14 wherein the drive disk includes two parallel segments which define opposing inside walls, and wherein the free end of said guide arm includes a cylindrical guide member which engages both of said inside walls.

16. The compressor as defined in claim 15 wherein the two parallel segments of said drive disk each mount an outer spherical segment for pivotally engaging a connecting region of the pistons.

17. The compressor as defined in claim 16 wherein the spherical segments on the two parallel segments of the drive disk define a ball, the center of which lies in the center of the cylindrical guide member of the guide arm.

18. The compressor as defined in claim 17 wherein the connecting region of each piston extends over an outer edge of the drive disk and engages each of the spherical segments.

* * * * *